US012794584B2

(12) United States Patent
Yoshino

(10) Patent No.: US 12,794,584 B2
(45) Date of Patent: Nov. 10, 2026

(54) PHOTONIC GATEWAY APPARATUS

(71) Applicant: NTT, Inc., Tokyo (JP)

(72) Inventor: Manabu Yoshino, Musashino (JP)

(73) Assignee: NTT, Inc., Tokyo (JP)

( * ) Notice: Subject to any disclaimer, the term of this patent is extended or adjusted under 35 U.S.C. 154(b) by 312 days.

(21) Appl. No.: 18/580,495

(22) PCT Filed: Jul. 21, 2021

(86) PCT No.: PCT/JP2021/027377

§ 371 (c)(1),
(2) Date: Jan. 18, 2024

(87) PCT Pub. No.: WO2023/002619

PCT Pub. Date: Jan. 26, 2023

(65) Prior Publication Data

US 2025/0080266 A1 Mar. 6, 2025

(51) Int. Cl.

*H04J 14/02* (2006.01)
*H04B 10/291* (2013.01)
*H04B 10/275* (2013.01)

(52) U.S. Cl.

CPC ........ *H04J 14/0307* (2023.08); *H04B 10/291* (2013.01); *H04B 10/275* (2013.01)

(58) Field of Classification Search

None
See application file for complete search history.

(56) References Cited

U.S. PATENT DOCUMENTS

| | | | | |
|---|---|---|---|---|
| 5,903,370 A * | 5/1999 | Johnson | .................... | H04J 3/14 398/4 |
| 6,233,074 B1 * | 5/2001 | Lahat | .................. | H04J 14/0212 398/79 |
| 8,131,150 B2 * | 3/2012 | Feuer | .................. | H04J 14/0212 398/55 |

(Continued)

FOREIGN PATENT DOCUMENTS

| | | |
|---|---|---|
| JP | H01114128 A | 5/1989 |
| JP | 2003078930 A | 3/2003 |

(Continued)

OTHER PUBLICATIONS

Tomoaki Yoshida, "APN WO sasaeru Photonic Gateway to hikari akusesu gijutsu (Photonic Gateway Supporting APN and Optical Access Technology)", Monthly Business Communication, Business Communication Co., Ltd., 2020, vol. 57, No. 10, pp. 16-17.

*Primary Examiner* — Jerry Rahll

(74) *Attorney, Agent, or Firm* — Harness, Dickey & Pierce, P.L.C.

(57) ABSTRACT

An optical switch includes a plurality of fifth ports and a plurality of sixth ports. A plurality of fifth ports of the optical switch are connected to a second ports of a first multiplexer-demultiplexer and a fourth ports of a second multiplexer-demultiplexer. A direction in which a wavelength component of a first wavelength out of an optical signal passing through the first port of the first multiplexer-demultiplexer travels and a direction in which the wavelength component of the first wavelength out of an optical signal passing through the third port of the second multiplexer-demultiplexer travels are opposite to each other.

13 Claims, 15 Drawing Sheets

(56) References Cited

U.S. PATENT DOCUMENTS

| | | | | |
|---|---|---|---|---|
| 8,929,738 | B2 * | 1/2015 | Dahlfort | H04J 14/0209 398/79 |
| 2002/0101633 | A1 * | 8/2002 | Onaka | H04J 14/0289 398/59 |
| 2003/0044109 | A1 * | 3/2003 | Maeda | H04Q 11/0005 385/24 |
| 2007/0172240 | A1 * | 7/2007 | Terai | H04J 14/0212 398/83 |

FOREIGN PATENT DOCUMENTS

| | | | |
|---|---|---|---|
| JP | 2006270677 | A | 10/2006 |
| WO | WO-2006035520 | A1 | 4/2006 |

* cited by examiner

PHOTONIC GATEWAY APPARATUS

CROSS-REFERENCE TO RELATED APPLICATIONS

This application is a 371 U.S. National Phase of International Application No. PCT/JP2021/027377, filed on Jul. 21, 2021. The entire disclosure of the above application is incorporated herein by reference.

TECHNICAL FIELD

The present invention relates to an optical gateway device (a photonic gateway apparatus).

BACKGROUND ART

Non Patent Literature 1 describes an optical gateway constituting an all-photonics network (photonic gateway). The optical gateway is provided between a core network and a plurality of service devices. Examples of the service devices include customer premises equipment (CPE) and the like. As described in Non Patent Literature 1, the optical gateway sets a wavelength of an optical signal transmitted by a service device and a path between the core network and the service device. The optical gateway includes an optical switch, a multiplexer-demultiplexer, and the like. The optical switch connects the service device and the core network. The multiplexer-demultiplexer performs wavelength division multiplexing on a plurality of optical signals having different wavelengths.

CITATION LIST

Non Patent Literature

Non Patent Literature 1: Tomoaki Yoshida, "APN wo sasaeru Photonic Gateway to hikari akusesu gijutsu (Photonic Gateway Supporting APN and Optical Access Technology)", "Monthly Business Communication", Business Communication Co., Ltd., 2020, vol. 57, no. 10, pp. 16-17

SUMMARY OF INVENTION

Technical Problem

A service device such as CPE is connected to the downstream side of the optical gateway device. When uplink and downlink communications are performed with signals of the same wavelength in single-core bidirectional communication via the same transmission path, reception of a signal from the opposing device is deteriorated due to reflection of its own transmission signal. Thus, in a case where uplink and downlink communications are performed via the same transmission path in single-core bidirectional communication in the service device or the core network, it is preferable to perform uplink and downlink communications using optical signals of different wavelengths. Therefore, in a case where single-core bidirectional transmission is performed in at least a part of the communication path, the optical gateway device allocates different wavelengths to the service device as the wavelengths of the uplink and downlink optical signals.

On the other hand, in order to efficiently use the wavelength resources of the optical signal, it is desirable to use all available wavelengths in each transmission path. In a case where the uplink and downlink communications of the different wavelengths are transmitted by single-core bidirectional transmission via the same transmission path, it is assumed that uplink and downlink wavelengths are allocated in a fixed manner at a one-to-one ratio, for example, such that a certain wavelength is dedicated to uplink and a certain wavelength is dedicated to downlink, from available wavelengths. In this case, in a case where the single-core bidirectional uplink and downlink are separated, only the uplink and the downlink of each are multiplexed, and are transmitted in unidirectional two cores as the transmission side and the reception side, respectively, only half of the available wavelength is used in each transmission path. Accordingly, it is preferable that the same wavelength is not limited to the uplink dedicated wavelength and the downlink dedicated wavelength, a wavelength allocated to the uplink by a certain service device is allocated to the downlink by another service device and used in both the uplink and downlink directions. For example, a first wavelength is allocated to the uplink signal and a second wavelength is allocated to the downlink signal of the first service device, the second wavelength is allocated to the uplink signal and the first wavelength is allocated to the downlink signal of the second service device, and the uplink signal and the downlink signal are multiplexed, respectively, so that the wavelength can be effectively used even in a transmission path in which signals to be transmitted in single-core bidirectional transmission are multiplexed and separated into unidirectional two cores directions and optical signals are transmitted.

Meanwhile, the multiplexer-demultiplexer constituting the optical gateway usually uses arrayed waveguide gratings (AWG) in which a combination of input/output wavelengths and ports on a separation side is fixed. Therefore, in the optical gateway device, it is difficult to directly connect a transmission path for transmitting both the uplink and the downlink by the single-core bidirectional transmission using different wavelengths to the port on the separation side of the AWG and to conduct the transmission path.

An object of the present invention is to provide an optical gateway device capable of allocating different wavelengths to a service device for an uplink signal and a downlink signal and using the same wavelength for the uplink signal and the downlink signal in a core network.

Solution to Problem

An aspect of the present invention includes a first multiplexer-demultiplexer, a second multiplexer-demultiplexer, and an optical switch. The first multiplexer-demultiplexer includes a first port and a plurality of second ports, separates an optical signal input from the first port and outputs separated optical signals from the plurality of second ports, and multiplexes optical signals input from the plurality of second ports and outputs a multiplexed optical signal from the first port. The second multiplexer-demultiplexer includes a third port and a plurality of fourth ports, separates an optical signal input from the third port and outputs separated optical signals from the plurality of fourth ports, and multiplexes optical signals input from the plurality of fourth ports and outputs a multiplexed optical signal from the third port. An optical switch includes a plurality of fifth ports and a plurality of sixth ports in which the second ports and the fourth ports are connected to the plurality of fifth ports, the optical switch performing switching of an optical signal between the plurality of fifth ports and the plurality of sixth ports. A direction in which a wavelength component of a first wavelength out of an optical signal passing through the first port travels and a direction in which the wavelength component of the first wavelength out of an optical signal passing through the third port travels are opposite to each other.

Advantageous Effects of Invention

According to the above aspect, different wavelengths can be allocated to an uplink signal and a downlink signal in a service device, and the same wavelength can be used for the uplink signal and the downlink signal in a core network.

DESCRIPTION OF EMBODIMENTS

First Embodiment

<<Configuration of Optical Network>>

Hereinafter, an embodiment will be described in detail with reference to the drawings.

Figure 1:
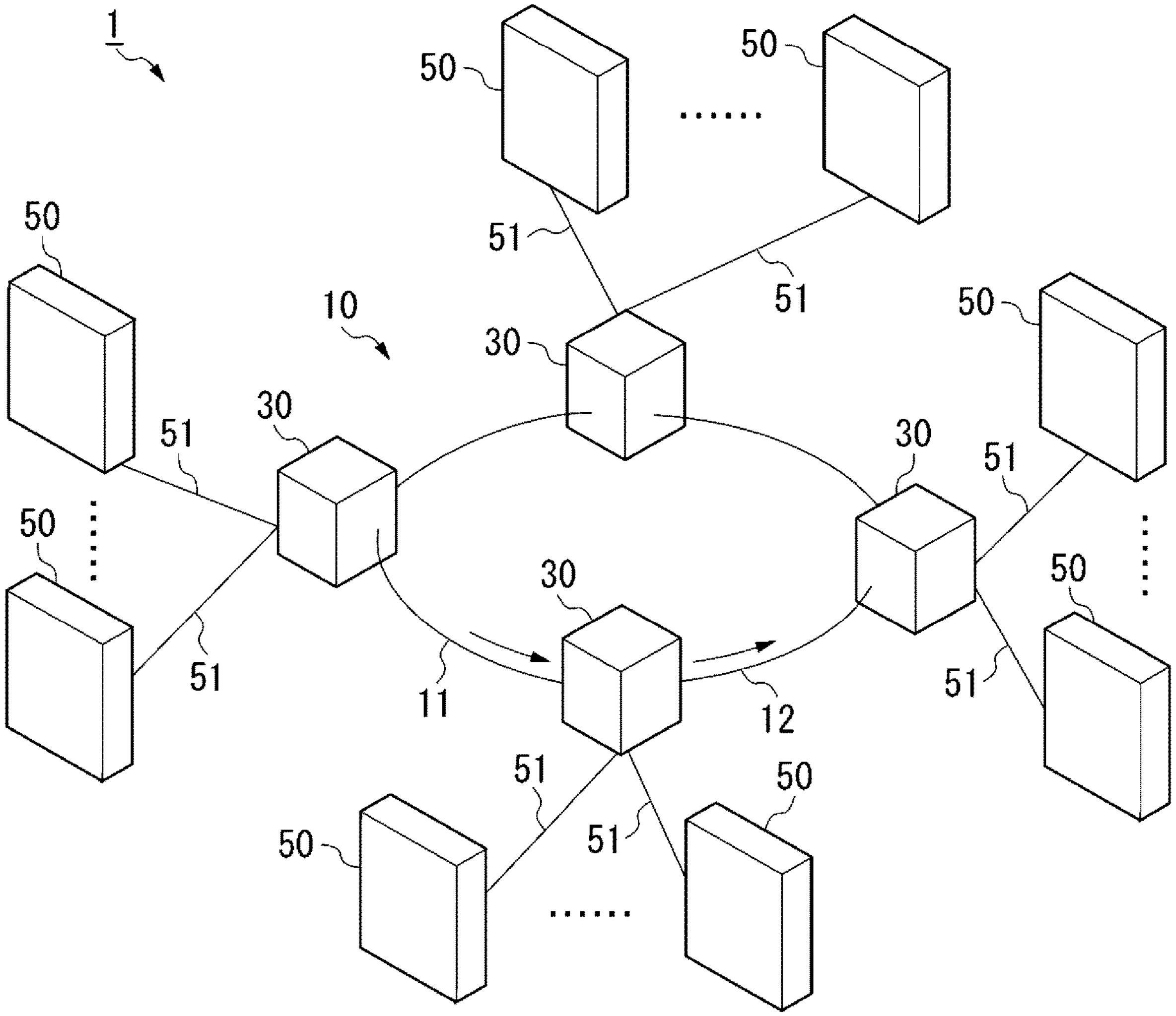
FIG. 1 is a schematic diagram illustrating a configuration of an optical network according to a first embodiment.

FIG. 1 is a schematic diagram illustrating a configuration of an optical network 1 according to a first embodiment.

The optical network 1 includes a plurality of optical gateway devices 30 connected to a core network 10. The core network 10 is a ring network. Here, in order to simplify the description, the core network 10 is a ring network including one transmission path for transmitting a signal in the counterclockwise direction. Note that, in another embodiment, the core network 10 may be a network having a counterclockwise transmission path and a clockwise transmission path, or may be a multi-ring network in which a plurality of ring networks is combined. In addition, in other embodiments, the core network 10 may be a full-mesh network rather than a ring network. In the optical network 1, an optical signal of N wavelengths is used. A signal obtained by multiplexing optical signals of a plurality of wavelengths is referred to as a multiplexed signal. The core network 10 performs single-core unidirectional transmission. In the present description, the "single-core unidirectional" is a method in which only optical signals traveling in the same direction can be transmitted through one transmission path. Note that the transmission path may be a single-core fiber or a multicore fiber. In a case where the transmission path is a multicore fiber, a transmission method in which only optical signals traveling in the same direction (unidirectional) are transmitted in one core in the core wire, and the directions in which the optical signals travel are different between the cores is also the single-core unidirectional transmission. That is, the "single core" is not limited to one core wire of a single-core fiber, and includes one core in a multicore fiber.

An optical gateway device 30 is provided between the core network 10 and a service device 50, and relays communication between service devices 50. Hereinafter, in the optical gateway device 30, a side connected to the core network 10 is referred to as an "upstream side", and a side connected to the service device 50 is referred to as a "downstream side". Note that the optical gateway device 30 according to another embodiment may be connected to another optical gateway device 30 without passing through the core network 10. In this case, a side connected to another optical gateway device 30 is referred to as an "upstream side". The service device 50 and the optical gateway device 30 according to the first embodiment are connected via a third fiber 51. The third fiber 51 allows an optical signal traveling in an upstream direction and an optical signal traveling in a downstream direction to pass therethrough. That is, the third fiber 51 performs single-core bidirectional transmission. In the present description, "single-core bidirectional" is a method in which optical signals traveling in directions facing each other can be transmitted through one transmission path. In a case where the transmission path is a multicore fiber, a transmission method for transmitting optical signals traveling in directions facing each other in one core in the core wire is referred to as single-core bidirectional transmission. Note that the wavelength of the optical signal in the upstream direction and the wavelength of the optical signal in the downstream direction are different from each other.

<<Configuration of Optical Gateway Device 30>>

Figure 2:
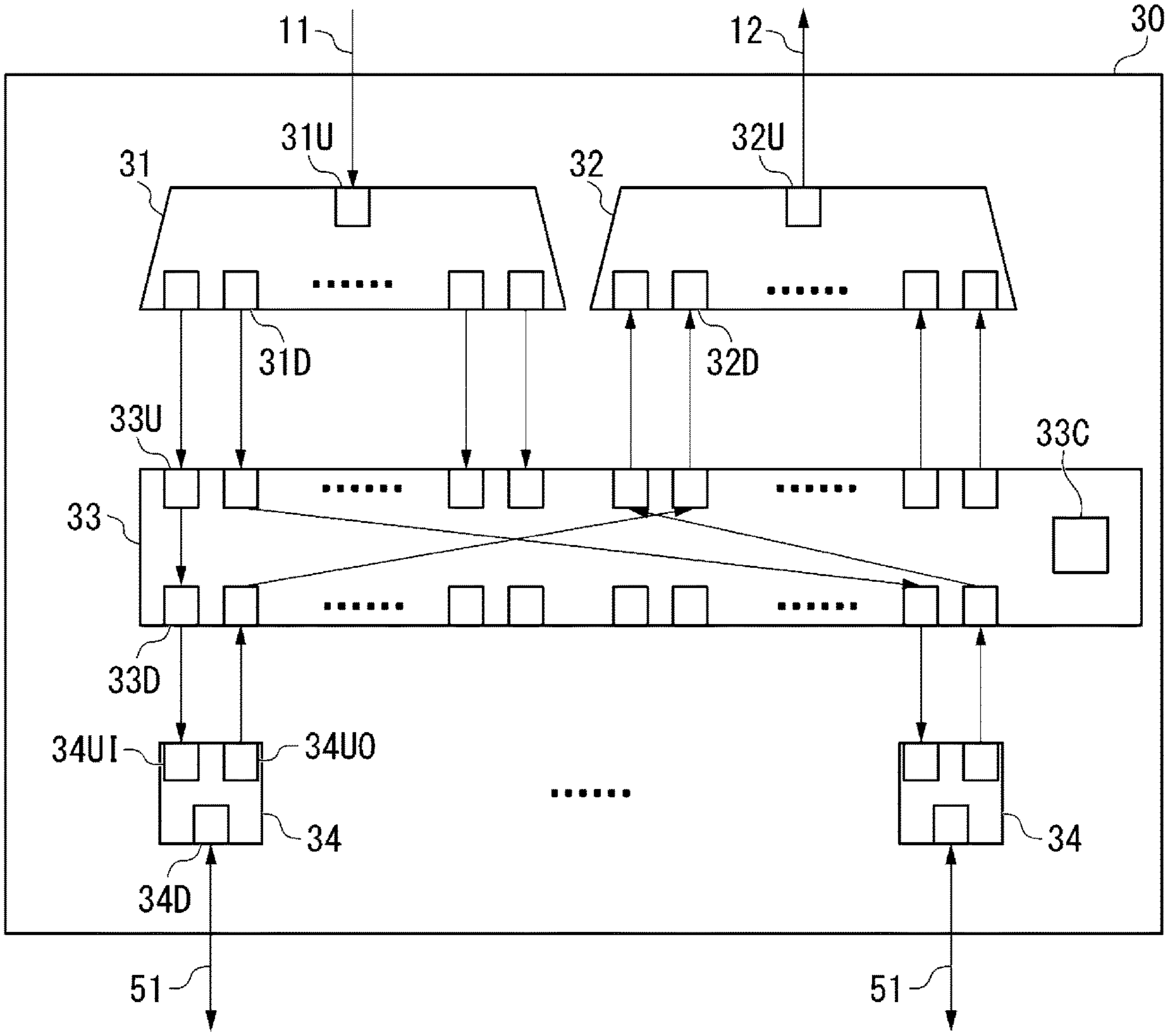
FIG. 2 is a schematic block diagram illustrating a configuration of an optical gateway device according to the first embodiment.

FIG. 2 is a schematic block diagram illustrating a configuration of the optical gateway device 30 according to the first embodiment. The optical gateway device 30 according to the first embodiment includes a first multiplexer-demultiplexer 31, a second multiplexer-demultiplexer 32, an optical switch 33, and L up-down separators 34. One service device 50 can be connected to one up-down separator 34. That is, up to L service devices 50 are connected to the optical gateway device 30.

The first multiplexer-demultiplexer 31 includes one upstream port 31U and N downstream ports 31D. The upstream port 31U is connected to the first fiber 11 extending from the upstream optical gateway device 30 (left adjacent optical gateway device 30) in the core network 10. The N downstream ports 31D are connected to corresponding upstream ports 33U of the optical switch 33. The first multiplexer-demultiplexer 31 separates a multiplexed signal input to the upstream port 31U into N optical signals having different wavelengths, and outputs the N optical signals from the downstream port 31D corresponding to each wavelength. As the first multiplexer-demultiplexer 31, for example, the AWG can be used.

The second multiplexer-demultiplexer 32 includes one upstream port 32U and N downstream ports 32D. The upstream port 32U is connected to the second fiber 12 extending from the downstream optical gateway device 30 (right adjacent optical gateway device 30) in the core network 10. The N downstream ports 32D are connected to corresponding upstream ports 33U of the optical switch 33. The second multiplexer-demultiplexer 32 multiplexes optical signals input to the N downstream ports 32D, and outputs a multiplexed signal from the upstream port 32U. As the first multiplexer-demultiplexer 31, for example, the AWG can be used.

The optical switch 33 includes 2N upstream ports 33U, 2L downstream ports 33D, and a control device 33C. The optical switch 33 transmits an optical signal input to an upstream port 33U to the downstream port 33D that is allocated by the control device 33C among the 2L downstream ports 33D. Further, the optical switch 33 transmits an optical signal input to a downstream port 33D to the upstream port 33U that is allocated by the control device 33C among the 2N upstream ports 33U. That is, the optical switch 33 switches the optical signal between the upstream port 33U and the downstream port 33D. The connection relationship between the upstream port 33U and the downstream port 33D in the optical switch 33 is determined according to a control signal from the control device 33C. The optical switch 33 may be, for example, a fiber cross connect (FXC) or other many-to-many optical switch.

The control device 33C may use a processor. The control device 33C may be a computer that includes a processor, a memory, an auxiliary storage device, and the like connected by a bus and executes a predetermined process by executing a program. Examples of the processor include a central processing unit (CPU), a graphic processing unit (GPU), and a microprocessor. Examples of the processor include a custom large scale integrated circuit (LSI) such as an application specific integrated circuit (ASIC) and a programmable logic device (PLD). Examples of the PLD include a programmable array logic (PAL), a generic array logic (GAL), a complex programmable logic device (CPLD), and a field programmable gate array (FPGA).

The control device 33C sets the wavelengths and the paths so as to satisfy all of the following three conditions. A first condition is that different wavelengths are allocated to an uplink signal and a downlink signal of one service device 50. A second condition is that the wavelength of an uplink signal passing through the same transmission path in the core network 10 is different for each service device 50. A third condition is that the wavelength of a downlink signal passing through the same transmission path in the core network 10 is different for each service device 50. Note that, in the optical gateway device 30 according to the present embodiment, the control device 33C of the optical switch 33 performs wavelength allocation, but it is not limited thereto in other embodiments. For example, the optical gateway device 30 according to another embodiment may include an upper control device separately from the control device 33C of the optical switch 33, and the upper control device may perform wavelength allocation. In this case, the upper control device outputs a path or connection switching instruction to the control device 33C on the basis of the wavelength allocation result. In another embodiment, a device that controls the entire network may allocate the wavelength.

The up-down separator 34 includes an upstream input port 34UI, an upstream output port 34UO, and a downstream port 34D. The upstream input port 34UI and the upstream output port 34UO are connected to the downstream port 33D of the optical switch 33. The downstream port 34D is connected to the third fiber 51. The up-down separator 34 outputs an optical signal input to the upstream input port 34UI from the downstream port 34D. The up-down separator 34 outputs an optical signal input to the downstream port 34D from the upstream output port 34UO. The up-down separator 34 may include, for example, an optical circulator. In addition, the up-down separator 34 may include, for example, a multiplexing-demultiplexing module such as the AWG.

<<Operations and Effects>>

Figure 3:
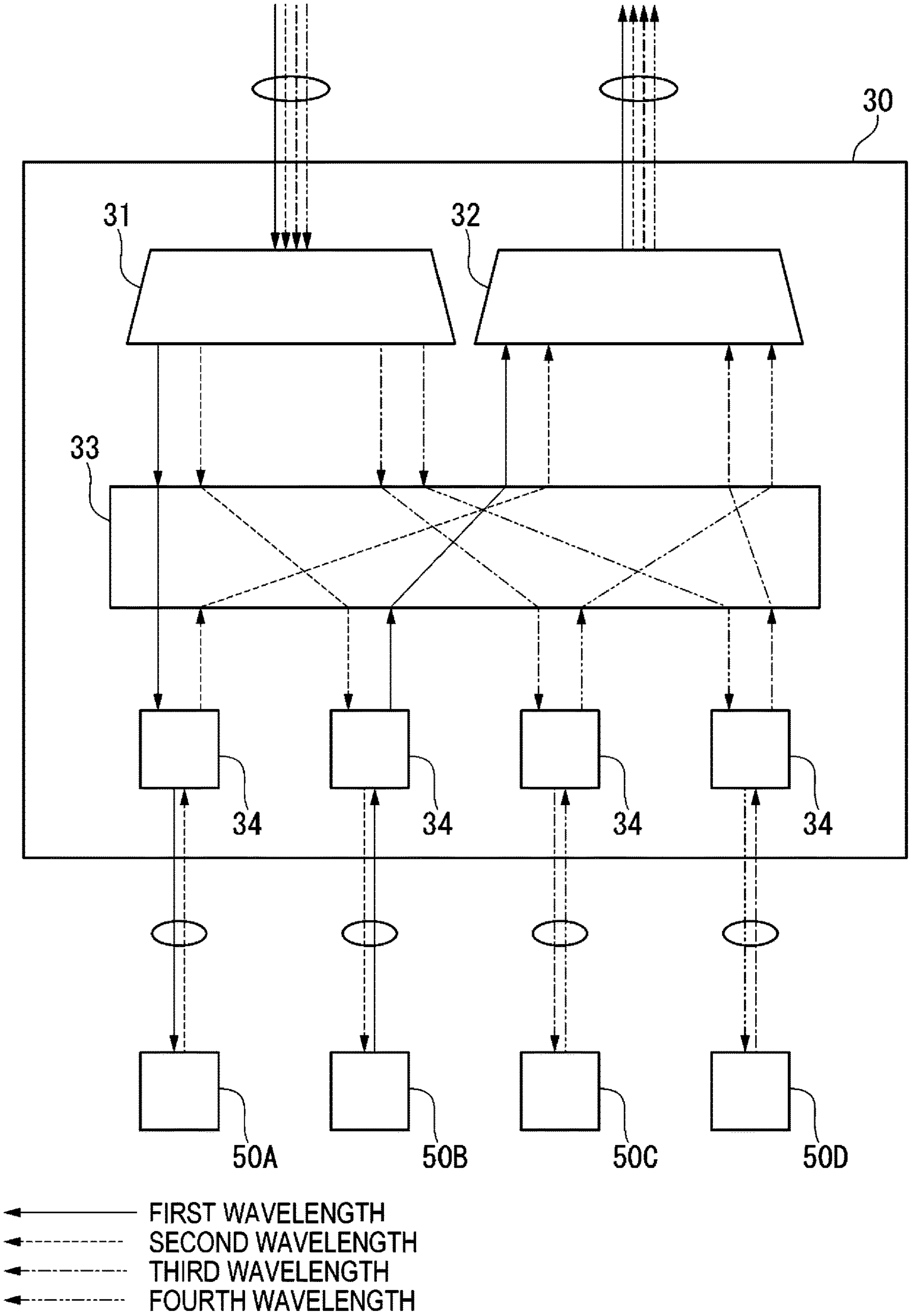
FIG. 3 is a diagram illustrating a flow of a signal in the optical gateway device according to the first embodiment.

FIG. 3 is a diagram illustrating a signal flow in the optical gateway device 30 according to the first embodiment. As described above, in the optical gateway device 30 according to the first embodiment, the first multiplexer-demultiplexer 31 processes optical signals in the downstream direction related to the N wavelengths, and the second multiplexer-demultiplexer 32 processes optical signals in the upstream direction related to the N wavelengths. That is, in the optical gateway device 30, a direction in which a wavelength component out of a first wavelength travels in the optical signal passing through the upstream port 31U of the first multiplexer-demultiplexer 31 and a direction in which a wavelength component out of the first wavelength travels in the optical signal passing through the upstream port 32U of the second multiplexer-demultiplexer 32 are opposite to each other. Thus, the optical gateway device 30 can prevent interference due to reflection of the uplink signal and the downlink signal by making wavelengths of optical signals transmitted by the single-core bidirectional transmission in the service device 50 different between the upstream direction and the downstream direction. Furthermore, the optical gateway device 30 can improve wavelength use efficiency by using the same wavelength for both the uplink signal and the downlink signal without being dedicated to the uplink signal or the downlink signal in each transmission path of the core network 10 that transmits the optical signal by the single-core unidirectional transmission. That is, the optical gateway device 30 sets the same wavelength to an uplink signal of a certain service device 50 and a downlink signal of a service device 50 different from the uplink signal.

For example, as illustrated in FIG. 3, when the first wavelength is allocated to an uplink signal of a service device 50A and the second wavelength is allocated to a downlink signal thereof, the optical gateway device 30 can allocate the second wavelength to an uplink signal of a service device 50B and allocate the first wavelength to a downlink signal thereof. Similarly, the optical gateway device 30 can allocate a third wavelength to an uplink signal of a service device 50C and a fourth wavelength to the downlink signal thereof, and allocate the fourth wavelength to an uplink signal of a service device 50D and the third wavelength to the downlink signal thereof.

Note that, in the optical gateway device 30, assuming two wavelengths as a pair, it is not necessary to set the pair of wavelengths to be opposite to each other in uplink signals and downlink signals of the two service devices 50. That is, in the optical gateway device 30, it is not necessary to set one of the pair of wavelengths to the uplink signal of one of the two service devices 50, set the other of the pair of wavelengths to the downlink signal thereof, set one of the pair of wavelengths to the downlink signal of the other of the two service devices 50, and set the other of the pair of wavelengths to the uplink signal thereof. For example, among the optical signals obtained by separating direction-multiplexed signals in respective directions, one obtained by shifting the relationship with the wavelength of the uplink signal between the service devices 50 that multiplex the optical signals in the same direction and transmit the multiplexed optical signals in the same transmission path may be allocated as the downlink signal. For example, when the first wavelength is allocated to an uplink signal of a service device A, the second wavelength is allocated to an uplink signal of a service device B, the third wavelength is allocated to an uplink signal of a service device C, and the fourth wavelength is allocated to an uplink signal of a service device D, the optical gateway device 30 may allocate the second wavelength to the uplink signal of the service device A, the third wavelength to the uplink signal of the service device B, the fourth wavelength to the uplink signal of the service device C, and the first wavelength to the uplink signal of the service device D. In the optical network 1 according to the first embodiment, since the wavelength available to the service device 50 increases, it is possible to improve the fault tolerance of the service device 50.

Note that the up-down separator 34 may be configured according to wavelength setting.

For example, it is assumed that, among signals of N wavelengths, optical signals related to first to [N/2]-th wavelengths (first wavelength group, that is, short wavelength side) are directed in the downstream direction, and optical signals related to [N/2+1]-th to second [N/2] wavelengths (second wavelength group, that is, long wavelength side) are directed in the upstream direction. Note that [•] is a Gaussian symbol and represents the maximum integer value that does not exceed an inner value. That is, in a case where N is an even number, 2[N/2] is N, and in a case where N is an odd number, 2 [N/2] is (N−1). In a case where N is an odd number, the optical signal related to the N-th wavelength may not be used.

In this case, each of the up-down separators 34 can include a wavelength filter that separates an optical signal into a component of the first wavelength group and a component of the second wavelength group. Further, in this case, the control device 33C controls each of the up-down separators 34 to be connected to only one of the first multiplexer-demultiplexer 31 and the second multiplexer-demultiplexer 32.

The control device 33C controls the optical switch 33 so as to connect the downstream port 33D of the optical switch 33 connected to the upstream input port 34UI of the up-down separator 34 and the upstream port 33U connected to a downstream port on the first wavelength group side of the first multiplexer-demultiplexer 31 or the second multiplexer-demultiplexer 32. Further, the control device 33C controls the optical switch 33 so as to connect the downstream port 33D of the optical switch 33 connected to the upstream output port 34UO of the up-down separator 34 and the upstream port 33U connected to a downstream port on the second wavelength group side of the first multiplexer-demultiplexer 31 or the second multiplexer-demultiplexer 32. The control device 33C allocates a wavelength corresponding to a downstream port of the first multiplexer-demultiplexer 31 or the second multiplexer-demultiplexer 32 connected to the upstream input port 34UI of the up-down separator 34 via the optical switch 33 to the downlink signal of the service device 50 connected to the up-down separator 34. The control device 33C allocates the wavelength corresponding to the downstream port of the first multiplexer-demultiplexer 31 or the second multiplexer-demultiplexer 32 connected to the upstream output port 34UO of the up-down separator 34 via the optical switch 33 to an uplink signal of the service device 50 connected to the up-down separator 34.

The first to [N/2]-th wavelengths may be on the long wavelength side, and the [N/2+1]-th to second [N/2] wavelengths may be on the short wavelength side. At this time, the control device 33C allocates the service devices 50 facing each other so that the wavelength of the uplink signal and the wavelength of the downlink signal are opposite to each other.

As the up-down separator 34, a periodic filter such as a Mach-Zehnder (MZ) filter may be used. In a case where a 2×2 port MZ filter is used, one of the two ports on the downstream side is non-reflection-terminated. In this case, the control device 33C allocates wavelengths corresponding to passing wavelengths of the two upstream ports of the up-down separators 34 connected to the service device 50 as the wavelengths of the uplink signal and the downlink signal of each service device 50. Then, the control device 33C performs control to connect the downstream port 33D of the optical switch 33 connected to the upstream input port 34UI of the up-down separator 34 and the upstream port 33U of the optical switch 33 connected to the downstream port 31D corresponding to the wavelength allocated to the downlink signal of the service device 50 connected to the up-down separator 34 among the downstream ports 31D of the first multiplexer-demultiplexer 31. In addition, the control device 33C controls the optical switch 33 so as to connect the downstream port 33D of the optical switch 33 connected to the upstream output port 34UO of the up-down separator 34 and the upstream port 33U of the optical switch 33 connected to a downstream port 32D corresponding to the wavelength allocated to the uplink signal of the service device 50 connected to the up-down separator 34 out of the downstream ports 32D of the second multiplexer-demultiplexer 32.

In addition, a circulator may be used as the up-down separator 34. In this case, the control device 33C may allocate arbitrary wavelengths different from each other as the wavelengths of the uplink signal and the downlink signal of each service device 50. The control device 33C performs control to connect the downstream port 33D of the optical switch 33 connected to the upstream input port 34UI of the up-down separator 34 and the upstream port 33U of the optical switch 33 connected to the downstream port 31D corresponding to the wavelength allocated to the downlink signal of the service device 50 connected to the up-down separator 34 of the first multiplexer-demultiplexer 31. The control device 33C controls the optical switch 33 so as to connect the downstream port 33D of the optical switch 33 connected to the upstream output port 34UO of the up-down separator 34 and the upstream port 33U of the optical switch 33 connected to the downstream port 32D corresponding to the wavelength allocated to the uplink signal of the service device 50 connected to the up-down separator 34 of the second multiplexer-demultiplexer 32.

The same applies to modifications and embodiments described later.

First Modification

Figure 4:
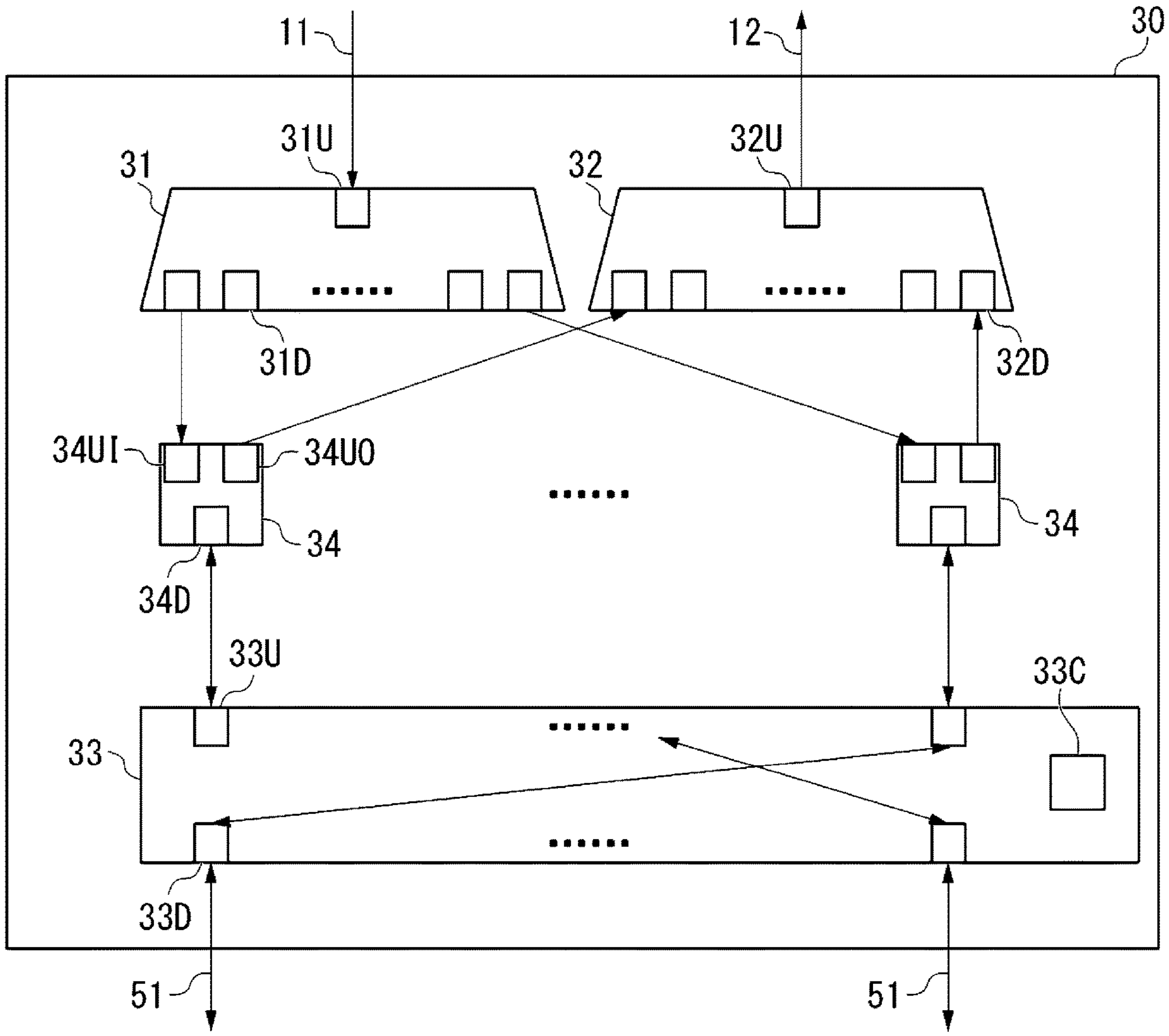
FIG. 4 is a diagram illustrating a configuration of the optical gateway device according to a first modification of the first embodiment.

In the optical gateway device 30 according to the first embodiment, the up-down separator 34 is provided on the downstream side of the optical switch 33, but it is not limited thereto. For example, in the optical gateway device 30 according to another embodiment, the up-down separator 34 may be provided on the upstream side of the optical switch 33. FIG. 4 is a diagram illustrating a configuration of the optical gateway device 30 according to a first modification of the first embodiment.

The upstream input port 34UI of the up-down separator 34 of the optical gateway device 30 according to the first modification is connected to the downstream port 31D of the first multiplexer-demultiplexer 31. The upstream output port 34UO of the up-down separator 34 is connected to the downstream port 32D of the second multiplexer-demultiplexer 32. The downstream port 34D of the up-down separator 34 is connected to the upstream port 33U of the optical switch 33. The downstream port 33D of the optical switch 33 is directly connected to the third fiber 51. Since the number of the up-down separators 34 is L, it is sufficient if the optical switch 33 according to the first modification include L upstream ports 33U and L downstream ports 33D.

In this case, the control device 33C sets the wavelengths and the paths so as to satisfy all of the following five conditions. The first condition is that different wavelengths are allocated to an uplink signal and a downlink signal of one service device 50. The second condition is that the wavelength of an uplink signal passing through the same transmission path in the core network 10 is different for each service device 50. The third condition is that the wavelength of a downlink signal passing through the same transmission path in the core network 10 is different for each service device 50. A fourth condition is that a wavelength corresponding to the port of the second multiplexer-demultiplexer 32 connected to the upstream output port 34UO of the up-down separator 34 connected to the service device 50 is allocated to the uplink signal of the service device 50. A fifth condition is that a wavelength corresponding to the port of the first multiplexer-demultiplexer 31 connected to the upstream input port 34UI of the up-down separator 34 connected to the service device 50 is allocated to the downlink signal of the service device 50.

Note that, as the up-down separator 34, a wavelength filter may be used after setting connection and wavelength similar to those of the optical gateway device 30 according to the first embodiment illustrated in FIG. 2. For example, it is assumed that, among signals of N wavelengths, the optical signals related to the first to [N/2]-th wavelengths (first wavelength group, that is, short wavelength side) are directed in the downstream direction, and the optical signals related to the [N/2+1]-th to second [N/2] wavelengths (second wavelength group, that is, long wavelength side) are directed in the upstream direction.

In this case, each of the up-down separators 34 can include a wavelength filter that separates an optical signal into a component of the first wavelength group and a component of the second wavelength group. The control device 33C controls the optical switch 33 so as to connect the upstream port 33U of the optical switch 33 connected to the downstream port 34D of the up-down separator 34 and the downstream port 33D of the optical switch 33. The control device 33C allocates a wavelength corresponding to a downstream port of the first multiplexer-demultiplexer 31 or the second multiplexer-demultiplexer 32 connected to the upstream input port 34UI of the up-down separator 34 to a downlink signal of the service device 50 connected to the up-down separator 34. The control device 33C allocates the wavelength corresponding to the downstream port of the first multiplexer-demultiplexer 31 or the second multiplexer-demultiplexer 32 connected to the upstream output port 34UO of the up-down separator 34 to an uplink signal of the service device 50 connected to the up-down separator 34.

The first to [N/2]-th wavelengths may be on the long wavelength side, and the [N/2+1]-th to second [N/2] wavelengths may be on the short wavelength side. At this time, the control device 33C allocates the service devices 50 facing each other so that the wavelength of the uplink signal and the wavelength of the downlink signal are opposite to each other.

A periodic filter such as an MZ filter may be used. The upstream input port 34UI of the up-down separator 34 is connected to the downstream port 31D of the first multiplexer-demultiplexer 31 having a wavelength corresponding to the passing wavelength of the upstream input port 34UI. Further, the upstream output port 34UO of the up-down separator 34 is connected to the downstream port 32D of the second multiplexer-demultiplexer 32 having a wavelength corresponding to the passing wavelength of the upstream output port 34UO. In this case, the control device 33C allocates a wavelength corresponding to the downstream port 31D of the first multiplexer-demultiplexer 31 connected to the upstream input port 34UI of one of the up-down separators 34 and a wavelength corresponding to the downstream port 32D of the second multiplexer-demultiplexer 32 connected to the upstream output port 34UO as wavelengths of the uplink signal and the downlink signal of each service device 50. Then, the control device 33C controls the optical switch 33 so as to connect the downstream port 33D of the optical switch 33 connected to the service device 50 and the upstream port 33U of the optical switch connected to the up-down separator 34 corresponding to the wavelength allocated to the service device 50.

In addition, a circulator may be used as the up-down separator 34. In this case, the upstream input port 34UI of the up-down separator 34 is connected to a certain downstream port 31D of the first multiplexer-demultiplexer 31. The upstream output port 34UO of the up-down separator 34 is connected to the downstream port 32D corresponding to a wavelength different from the wavelength input to the upstream input port 34UI in the second multiplexer-demultiplexer 32. In this case, the control device 33C allocates the wavelength corresponding to the downstream port 31D of the first multiplexer-demultiplexer 31 connected to the upstream input port 34UI of one of the up-down separators 34 and the wavelength corresponding to the downstream port 32D of the second multiplexer-demultiplexer 32 connected to the upstream output port 34UO as wavelengths of the uplink signal and the downlink signal of each service device 50. The control device 33C controls the optical switch 33 so as to connect the downstream port 33D of the optical switch 33 connected to the service device 50 and the upstream port 33U of the optical switch connected to the up-down separator 34 corresponding to the wavelength allocated to the service device 50.

According to the first modification of the first embodiment, a bidirectional signal is input to the upstream port 33U and the downstream port 33D of the optical switch 33, and a bidirectional signal is output. Similarly to the first embodiment, the optical gateway device 30 according to the first modification can also prevent interference due to reflection of the uplink signal and the downlink signal by making the wavelength of optical signals transmitted by the single-core bidirectional transmission in the service device 50 different between the upstream direction and the downstream direction. In addition, the optical gateway device 30 according to the first modification can improve the wavelength use efficiency by using the same wavelength component for both the uplink signal and the downlink signal without being dedicated to the uplink signal or dedicated to the downlink signal in each transmission path of the core network 10 that transmits the optical signal by the single-core unidirectional transmission. That is, the optical gateway device 30 sets the same wavelength to an uplink signal of a certain service device 50 and a downlink signal of a service device 50 different from the uplink signal.

Second Modification

Figure 5:
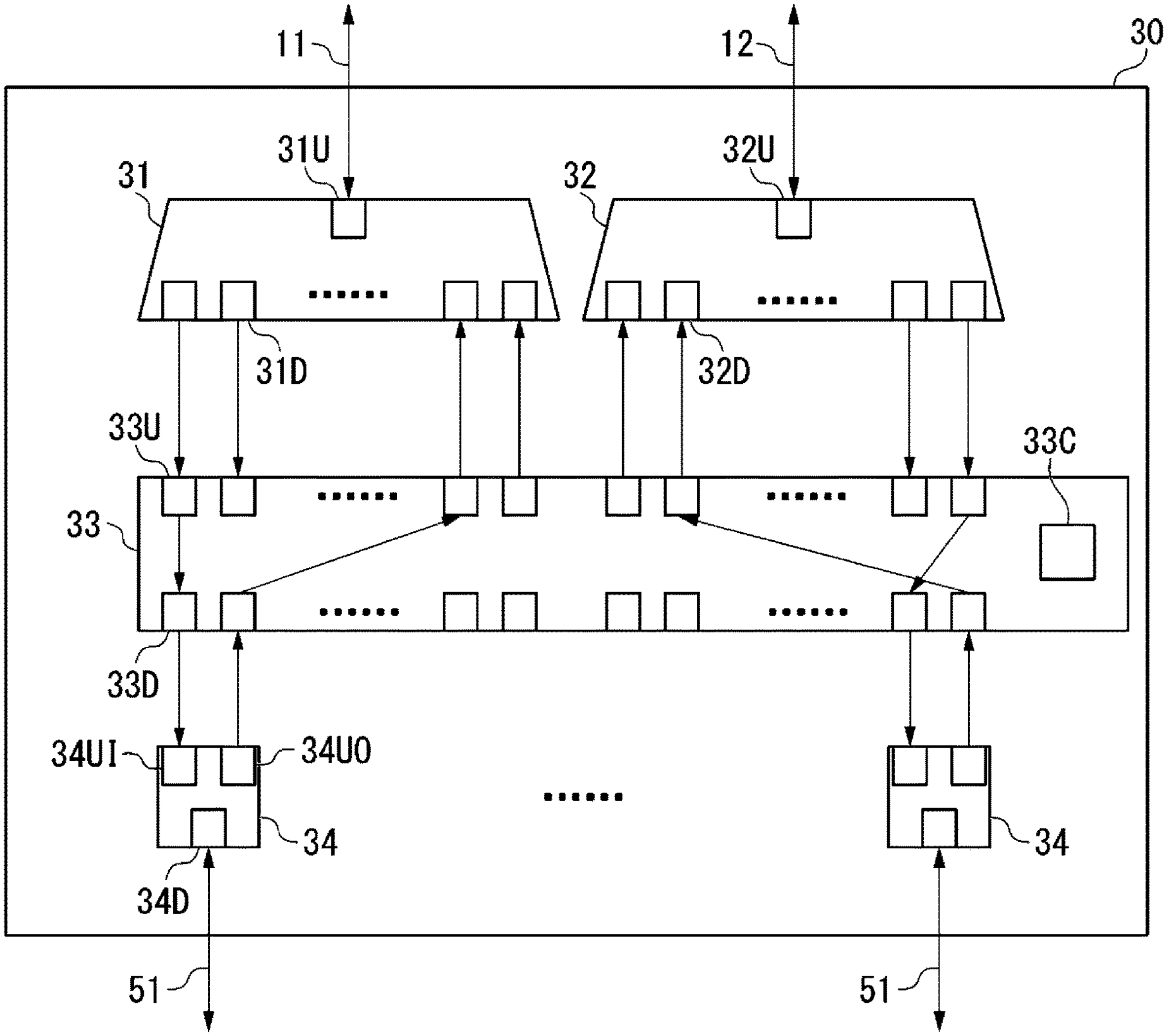
FIG. 5 is a diagram illustrating a configuration of the optical gateway device according to a second modification of the first embodiment.

In the optical gateway device 30 according to the first embodiment, the optical fiber connected to the upstream side performs the single-core unidirectional transmission, but the embodiment is not limited thereto. For example, an optical fiber connected to the upstream side of the optical gateway device 30 according to another embodiment may perform the single-core bidirectional transmission. FIG. 5 is a diagram illustrating a configuration of the optical gateway device 30 according to a second modification of the first embodiment.

The first fiber 11 and the second fiber 12 according to the second modification perform the single-core bidirectional transmission. For example, among signals of N wavelengths passing through the first fiber 11, the optical signals related to the first to [N/2]-th wavelengths (first wavelength group, that is, short wavelength side) are directed in the downstream direction, and the optical signals related to the [N/2+1]-th to second [N/2] wavelengths (second wavelength group, that is, long wavelength side) are directed in the upstream direction.

That is, in the first multiplexer-demultiplexer 31 according to the second modification, the optical signal related to the first wavelength group is directed in the downstream direction, and the optical signal related to the second wavelength group is directed in the upstream direction. On the other hand, among the N wavelength signals passing through the second fiber 12, the optical signals related to the first to [N/2]-th wavelengths are directed in the upstream direction, and the optical signals related to the [N/2+1]-th to second [N/2] wavelengths are directed in the downstream direction. That is, in the second multiplexer-demultiplexer 32 according to the second modification, the optical signal related to the first wavelength group is directed in the upstream direction, and the optical signal related to the second wavelength group is directed in the downstream direction. In this case, each of the up-down separators 34 can include a wavelength filter that separates an optical signal into a component of the first wavelength group and a component of the second wavelength group. In this case, the control device 33C performs control such that each of the up-down separators 34 is connected to only one of the first multiplexer-demultiplexer 31 and the second multiplexer-demultiplexer 32.

The control device 33C controls the optical switch 33 so as to connect the downstream port 33D of the optical switch 33 connected to the upstream input port 34UI of the up-down separator 34 and the upstream port 33U connected to a downstream port on the first wavelength group side of the first multiplexer-demultiplexer 31 or the second multiplexer-demultiplexer 32. Further, the control device 33C controls the optical switch 33 so as to connect the downstream port 33D of the optical switch 33 connected to the upstream output port 34UO of the up-down separator 34 and the upstream port 33U connected to a downstream port on the second wavelength group side of the first multiplexer-demultiplexer 31 or the second multiplexer-demultiplexer 32. The control device 33C allocates a wavelength corresponding to a downstream port of the first multiplexer-demultiplexer 31 or the second multiplexer-demultiplexer 32 connected to the upstream input port 34UI of the up-down separator 34 via the optical switch 33 to the downlink signal of the service device 50 connected to the up-down separator 34. The control device 33C allocates the wavelength corresponding to the downstream port of the first multiplexer-demultiplexer 31 or the second multiplexer-demultiplexer 32 connected to the upstream output port 34UO of the up-down separator 34 via the optical switch 33 to an uplink signal of the service device 50 connected to the up-down separator 34.

In another modification, the first to [N/2]-th wavelengths may be on the long wavelength side, and the [N/2+1]-th to second [N/2] wavelengths may be set to the short wavelength side. At this time, the control device 33C allocates the service devices 50 facing each other so that the wavelength of the uplink signal and the wavelength of the downlink signal are opposite to each other.

In another modification, a periodic filter such as an MZ filter may be used as the up-down separator 34. In a case where a 2×2 port MZ filter is used, one of the two ports on the downstream side is non-reflection-terminated. In this case, the control device 33C allocates a wavelength to each service device 50 such that a wavelength in the upstream direction and a wavelength in the downstream direction for each period of the passing wavelength in the MZ filter correspond to each other. Then, the control device 33C performs control to connect the downstream port 33D of the optical switch 33 connected to the upstream input port 34UI of the up-down separator 34 and the upstream port 33U of the optical switch 33 connected to the downstream port corresponding to the wavelength allocated to the downlink signal of the service device 50 connected to the up-down separator 34 out of the first multiplexer-demultiplexer 31 and the second multiplexer-demultiplexer 32. In addition, the control device 33C controls the optical switch 33 so as to connect the downstream port 33D of the optical switch 33 connected to the upstream output port 34UO of the up-down separator 34 and the upstream port 33U of the optical switch 33 connected to the downstream port 32D corresponding to the wavelength allocated to the uplink signal of the service device 50 connected to the up-down separator 34 out of the downstream ports 32D of the second multiplexer-demultiplexer 32. That is, the control device 33C sets the wavelength of the downstream port of the first multiplexer-demultiplexer 31 or the second multiplexer-demultiplexer 32, which flows from the upstream input port 34UI of the up-down separator 34 to the downstream port 34D and is connected to the upstream input port 34UI via the optical switch 33, as the wavelength of the downlink signal of the service device 50. Further, the control device 33C sets the wavelength of the downstream port of the first multiplexer-demultiplexer 31 or the second multiplexer-demultiplexer 32, which flows from the downstream port 34D of the up-down separator 34 to the upstream output port 34UO and is connected to the upstream output port 34UO via the optical switch 33, as the wavelength of the uplink signal of the service device 50.

Note that, in a case where a circulator is used as the up-down separator 34 in another modification, the wavelength in the upstream direction and the wavelength in the downstream direction may be determined without being divided into the long wavelength side and the short wavelength side. That is, the wavelength corresponding to any half of the ports of the first multiplexer-demultiplexer 31 may be selected as the upstream wavelength, and the wavelength corresponding to the remaining half of the ports may be selected as the downstream wavelength. In this case, the upstream and downstream optical signals may be multiplexed and demultiplexed by the same multiplexer-demultiplexer, or may be multiplexed and demultiplexed by different multiplexers. Also in this case, the control device 33C allocates the service devices 50 facing each other such that the wavelength of the uplink signal and the wavelength of the downlink signal are opposite to each other. The control device 33C controls the optical switch 33 so as to connect the downstream port 33D of the optical switch 33 connected to the upstream input port 34UI of the up-down separator 34 and the upstream port 33U of the optical switch 33 connected to the downstream port corresponding to the wavelength allocated to the downlink signal of the service device 50 connected to the up-down separator 34 out of the first multiplexer-demultiplexer 31 and the second multiplexer-demultiplexer 32. The control device 33C performs control so as to connect the upstream output port 34UO of the up-down separator 34 and a port corresponding to the wavelength allocated to the uplink signal of the service device 50 connected to the up-down separator 34 out of the downstream ports of the first multiplexer-demultiplexer 31 or the second multiplexer-demultiplexer 32 via 33U and 33D.

Similarly to the first embodiment, the optical gateway device 30 according to the second modification can also prevent interference due to reflection of the uplink signal and the downlink signal by making the wavelength of optical signals transmitted by the single-core bidirectional transmission in the service device 50 different between the upstream direction and the downstream direction. In addition, the optical gateway device 30 according to the second modification can improve the wavelength use efficiency by using the same wavelength component in each transmission path of the core network 10.

Note that, in this case, the control device 33C sets the wavelengths and the paths so as to satisfy all of the following four conditions. The first condition is that different wavelengths are allocated to an uplink signal and a downlink signal of one service device 50. The second condition is that the wavelength of an uplink signal passing through the same transmission path in the core network 10 is different for each service device 50. The third condition is that the wavelength of a downlink signal passing through the same transmission path in the core network 10 is different for each service device 50. The fourth condition is that the wavelength of the first wavelength group is allocated to one of the uplink signal and the downlink signal of one service device 50, and the wavelength of the second wavelength group is allocated to the other.

As another modification, the wavelengths used in the uplink and the downlink may be matched between the first multiplexer-demultiplexer 31 and the second multiplexer-demultiplexer 32. For example, the optical gateway device 30 may be configured as follows. In both the first multiplexer-demultiplexer 31 and the second multiplexer-demultiplexer 32, the uplink signal is input to half of the ports on the short wavelength side of the ports on the separation side, and the downlink signal is output from half of the ports on the long wavelength side. In each of the up-down separators 34, the upstream port on the short wavelength side is the upstream output port 34UO, and the upstream port on the long wavelength side is the upstream input port 34UI. In this case, each of the up-down separators 34 may be connected to the first multiplexer-demultiplexer 31 or may be connected to the second multiplexer-demultiplexer 32. In this case, the control device 33C controls the path such that one of the two service devices 50 to which the same wavelength is allocated is connected to the first multiplexer-demultiplexer 31 and the other is connected to the second multiplexer-demultiplexer 32. Note that, in a case where the first fiber 11 and the second fiber 12 are used for the single-core bidirectional transmission as in the modification, the transmission path between the optical gateway devices 30 is not a unidirectional transmission path. Therefore, the configuration of the modification is suitable for communication in which the optical gateway devices 30 face each other through the same transmission path.

Figure 6:
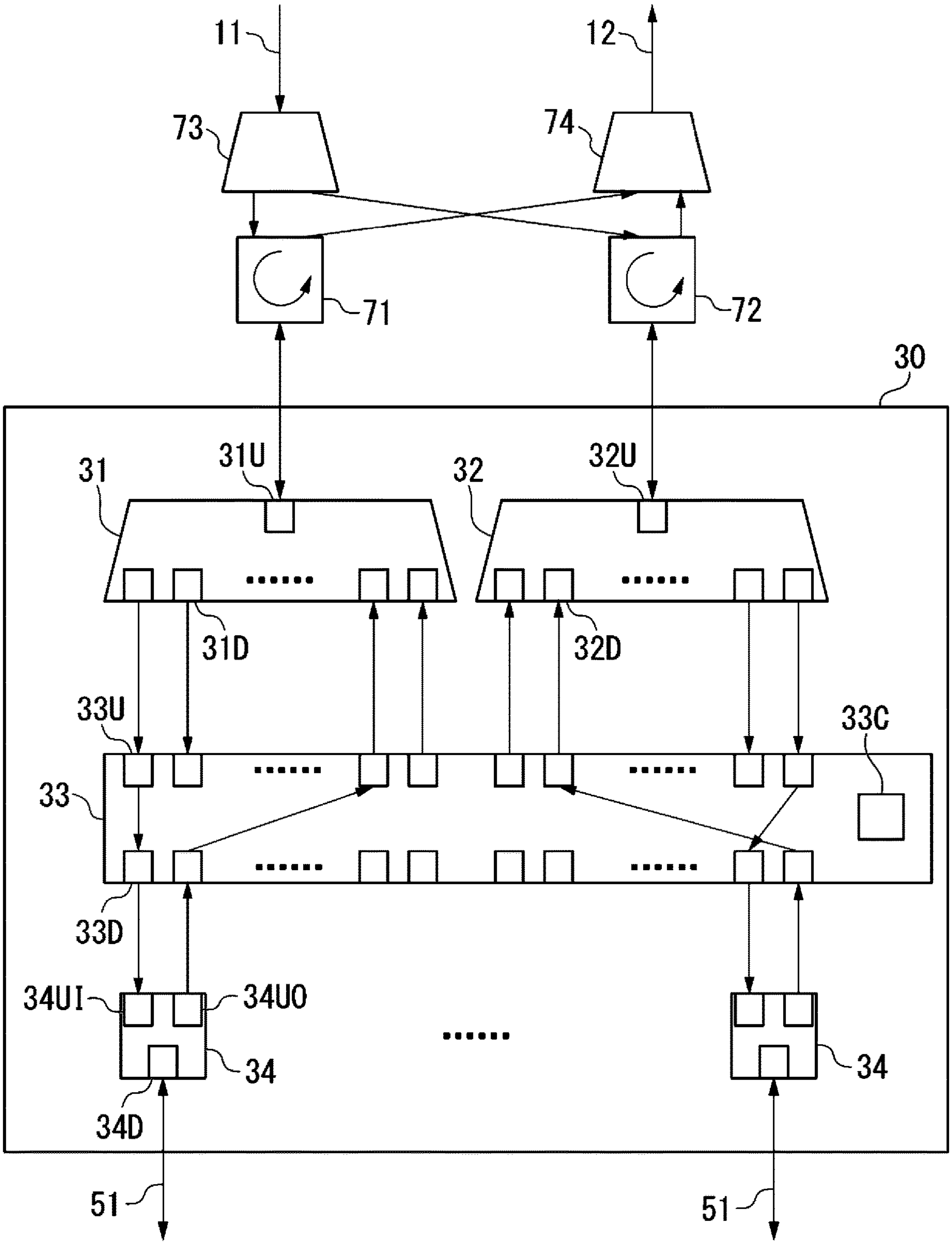
FIG. 6 is a diagram illustrating a configuration for connecting to a core network of single-core unidirectional transmission by the optical gateway device of the second modification according to the first embodiment.

Note that, in the second modification, in a case where the core network 10 performs the single-core unidirectional transmission while the output of the optical gateway device 30 is the single-core bidirectional transmission, by providing two circulators 71 and 72, a splitter 73, and a coupler 74 at the upstream end of the optical gateway device 30, it is possible to connect the optical gateway device 30 and the core network 10 that performs the single-core unidirectional transmission. FIG. 6 is a diagram illustrating a configuration for connecting to the core network 10 of the single-core unidirectional transmission by the optical gateway device 30 of the second modification according to the first embodiment. Specifically, it is as follows. The circulator 71 connected to the upstream port 31U of the first multiplexer-demultiplexer 31 separates a signal passing through the upstream port 31U into an uplink signal and a downlink signal. The circulator 72 connected to the upstream port 32U of the second multiplexer-demultiplexer 32 separates a signal passing through the upstream port 32U into an uplink signal and a downlink signal.

The splitter 73 connected to the first fiber 11 separates a downlink signal transmitted from the first fiber into two wavelength groups and distributes separated downlink signals to the circulator 71 and the circulator 72. The coupler 74 connected to the second fiber 12 combines uplink signals of the service devices 50 transmitted from the circulator 71 and the circulator 72 and transmits the combined signal to the second fiber 12.

Note that the circulators 71 and 72, the splitter 73, and the coupler 74 may be provided as a configuration of the optical gateway device 30. From the viewpoint of loss, a low-loss filter that divides the first wavelength group and the second wavelength group into two may be used as the coupler without using the AWG or the MZ filter. In addition, instead of the circulators 71 and 72, an MZ filter with a ring resonator in which switching between transmission and blocking characteristics is steeper or a wavelength division multiplexing (WDM) filter that divides a wavelength to be used into two may be used. For example, in a case where the first wavelength group and the second wavelength group are divided into two by the [N/2]-th wavelength in the optical gateway device 30, a WDM filter in which transmission and reflection are switched between the [N/2] wavelength and

[N/2+1] can be used instead of the circulators 71 and 72. Furthermore, for example, in a case where the first wavelength group and the second wavelength group are different for each predetermined number of wavelengths in the optical gateway device 30, an MZ filter can be used instead of the circulators 71 and 72.

According to the second embodiment, it is possible to add the AWG on demand, and it is possible to achieve an effect that the AWG type can be unified. In a case where the AWG is added on demand, the control device 33C of the optical gateway device 30 allows one service device 50 to use a plurality of paths in the same direction and use the same wavelength in each path. For example, the control device 33C may allocate the first wavelength and the second wavelength to the uplink signal of one service device 50, and may allocate the third wavelength and the fourth wavelength to the downlink signal. Further, when the AWG is added, the control device 33C allows signals of the same wavelength to be allocated to different service devices 50. Thus, the optical gateway device 30 can achieve addition of the AWG on demand. Specifically, a multiplexer-demultiplexer of the same type as the first multiplexer-demultiplexer 31 and the second multiplexer-demultiplexer 32 is added as the number of service devices 50 to be connected increases. Then, the upstream port of the added multiplexer-demultiplexer and the upstream port of the first multiplexer-demultiplexer 31 or the second multiplexer-demultiplexer 32 are multiplexed or branched to connect the added multiplexer-demultiplexer to the core network 10.

Note that, in the configuration of the second modification, the position of the up-down separator 34 may be different as in the first modification. That is, the optical gateway device 30 may have the following configuration. In half of the plurality of up-down separators 34, the upstream input port 34UI is connected to a port corresponding to the first wavelength group among the downstream ports 31D of the first multiplexer-demultiplexer 31, and the upstream output port 34UO is connected to a port corresponding to the second wavelength group among the downstream ports 31D of the first multiplexer-demultiplexer 31. In the remaining half of the plurality of up-down separators 34, the upstream input port 34UI is connected to a port corresponding to the second wavelength group among the downstream ports 32D of the second multiplexer-demultiplexer 32, and the upstream output port 34UO is connected to a port corresponding to the first wavelength group among the downstream ports 32D of the second multiplexer-demultiplexer 32.

As the up-down separator 34, a wavelength filter according to wavelength setting may be used. For example, it is assumed that, among signals of N wavelengths, the optical signals related to the first to [N/2]-th wavelengths (first wavelength group, that is, short wavelength side) are directed in the downstream direction, and the optical signals related to the [N/2+1]-th to second [N/2] wavelengths (second wavelength group, that is, long wavelength side) are directed in the upstream direction.

In this case, each of the up-down separators 34 can include a wavelength filter that separates an optical signal into a component of the first wavelength group and a component of the second wavelength group. The control device 33C controls the optical switch 33 so as to connect the upstream port 33U of the optical switch 33 connected to the downstream port 34D of the up-down separator 34 and the downstream port 33D of the optical switch 33. The control device 33C allocates the wavelength corresponding to the downstream port of the first multiplexer-demultiplexer 31 or the second multiplexer-demultiplexer 32 connected to the upstream input port 34UI of the up-down separator 34 to a downlink signal of the service device 50 connected to the up-down separator 34. The control device 33C allocates the wavelength corresponding to the downstream port of the first multiplexer-demultiplexer 31 or the second multiplexer-demultiplexer 32 connected to the upstream output port 34UO of the up-down separator 34 to an uplink signal of the service device 50 connected to the up-down separator 34.

The first to [N/2]-th wavelengths may be on the long wavelength side, and the [N/2+1]-th to second [N/2] wavelengths may be on the short wavelength side. At this time, the control device 33C allocates the service devices 50 facing each other so that the wavelength of the uplink signal and the wavelength of the downlink signal are opposite to each other.

In addition, as the up-down separator 34, a periodic filter such as an MZ filter may be used. The upstream input port 34UI of the up-down separator 34 is connected to a downstream port having the wavelength corresponding to the passing wavelength of the upstream input port 34UI out of the first multiplexer-demultiplexer 31 and the second multiplexer-demultiplexer 32. Further, the upstream output port 34UO of the up-down separator 34 is connected to a downstream port having the wavelength corresponding to the passing wavelength of the upstream output port 34UO out of the first multiplexer-demultiplexer 31 and the second multiplexer-demultiplexer 32. In this case, the control device 33C allocates a wavelength corresponding to a downstream port of the multiplexer-demultiplexer connected to the upstream input port 34UI of one of the up-down separators 34 and a wavelength corresponding to a downstream port of the multiplexer-demultiplexer connected to the upstream output port 34UO as wavelengths of the uplink signal and the downlink signal of each of the service devices 50. Then, the control device 33C controls the optical switch 33 so as to connect the downstream port 33D of the optical switch 33 connected to the service device 50 and the upstream port 33U of the optical switch connected to the up-down separator 34 corresponding to the wavelength allocated to the service device 50.

In addition, a circulator may be used as the up-down separator 34. In this case, the upstream input port 34UI and the upstream output port 34UO of the up-down separator 34 are connected to different downstream ports 32D of the first multiplexer-demultiplexer 31 or the second multiplexer-demultiplexer 32. In this case, the control device 33C allocates a wavelength corresponding to a downstream port of the multiplexer-demultiplexer connected to the upstream input port 34UI of one of the up-down separators 34 and a wavelength corresponding to a downstream port of the multiplexer-demultiplexer connected to the upstream output port 34UO as wavelengths of the uplink signal and the downlink signal of each of the service devices 50. The control device 33C controls the optical switch 33 so as to connect the downstream port 33D of the optical switch 33 connected to the service device 50 and the upstream port 33U of the optical switch connected to the up-down separator 34 corresponding to the wavelength allocated to the service device 50.

In this case, the control device 33C sets the wavelengths and the paths so as to satisfy all of the following six conditions. The first condition is that different wavelengths are allocated to an uplink signal and a downlink signal of one service device 50. The second condition is that the wavelength of an uplink signal passing through the same transmission path in the core network 10 is different for each service device 50. The third condition is that the wavelength of a downlink signal passing through the same transmission path in the core network 10 is different for each service device 50. The fourth condition is that a combination of wavelengths of optical signals passing through one multiplexer-demultiplexer 31 or 32 is allocated to an uplink signal and a downlink signal of one service device 50. The fifth condition is that a wavelength corresponding to the port of the multiplexer-demultiplexer 31 or 32 connected to the upstream output port 34UO of the up-down separator 34 connected to the service device 50 is allocated to the uplink signal of the service device 50. The sixth condition is that the wavelength corresponding to the port of the multiplexer-demultiplexer 31 or 32 connected to the upstream input port 34UI of the up-down separator 34 connected to the service device 50 is allocated to the downlink signal of the service device 50.

Note that, in the second modification, the optical gateway device 30 in which the position of the up-down separator 34 is similar to that in the first modification can also be connected to the core network 10 that performs the single-core unidirectional transmission by providing the two circulators 71 and 72, the splitter 73, and the coupler 74 as illustrated in FIG. 6. The circulator 71 is connected to the upstream port 31U of the first multiplexer-demultiplexer 31. The circulator 72 is connected to the upstream port 32U of the second multiplexer-demultiplexer 32. The splitter 73 is provided between the first fiber 11 and the two circulators 71 and 72. The coupler 74 is provided between the second fiber 12, the two circulators 71, and the circulator 72.

Third Modification

Figure 7:
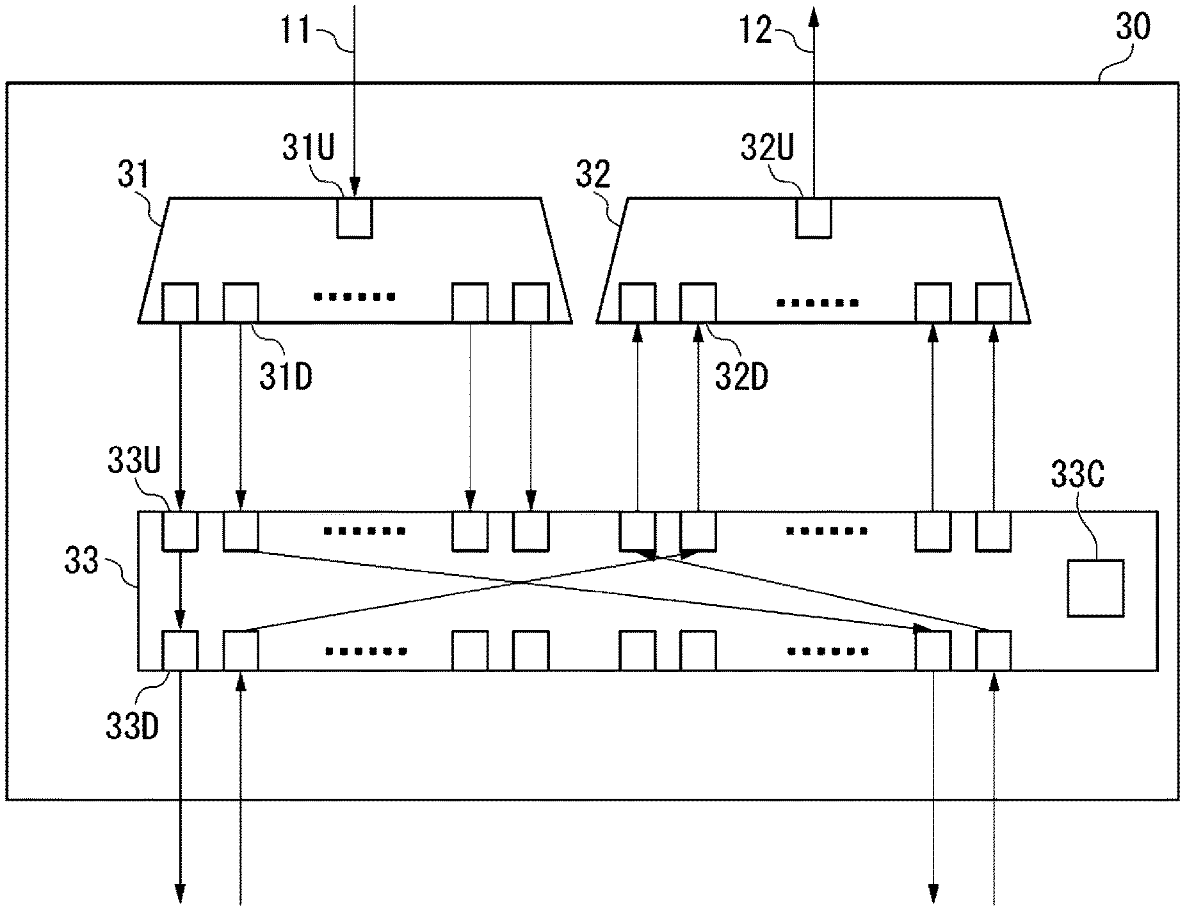
FIG. 7 is a diagram illustrating a configuration of the optical gateway device according to a third modification of the first embodiment.

In the optical gateway device 30 according to the first embodiment, the optical fiber connected to the downstream side performs the single-core bidirectional transmission, but the embodiment is not limited thereto. For example, the optical gateway device 30 according to another embodiment may perform the single-core unidirectional transmission using an optical fiber for an uplink signal and an optical fiber for a downlink signal with the service device 50. FIG. 7 is a diagram illustrating a configuration of the optical gateway device 30 according to a third modification of the first embodiment.

When the optical fiber connected to the downstream side performs the single-core unidirectional transmission, the optical gateway device 30 according to the third modification of the first embodiment does not need to include the up-down separator 34. Similarly to the first embodiment, the optical gateway device 30 according to the third modification can also allocate all the N wavelengths to the signal in the upstream direction and the signal in the downstream direction while preventing interference between the uplink signal and the downlink signal having the same wavelength due to reflection of the wavelength.

The control device 33C sets the wavelengths and the paths so as to satisfy all of the following three conditions. The first condition is that different wavelengths are allocated to an uplink signal and a downlink signal of one service device 50. The second condition is that the wavelength of an uplink signal passing through the same transmission path in the core network 10 is different for each service device 50. The third condition is that the wavelength of a downlink signal passing through the same transmission path in the core network 10 is different for each service device 50.

Second Embodiment

The first multiplexer-demultiplexer 31 and the second multiplexer-demultiplexer 32 according to the first embodiment include the AWG. Some AWGs have a wavelength cyclic characteristic. The optical gateway device 30 according to a second embodiment uses the AWG having a wavelength cyclic characteristic as the first multiplexer-demultiplexer 31 and the second multiplexer-demultiplexer 32, thereby implementing transmission for multiplexing and separating signals to be transmitted by the single-core bidirectional transmission at different wavelengths with a simpler configuration than the first embodiment. Note that, as the first multiplexer-demultiplexer 31 and the second multiplexer-demultiplexer 32, a combination of an optical multiplexer-demultiplexer or the like and an MZ filter with a ring resonator or a WDM filter having a sufficiently wide transmission band and steeply switching between transmission and cutoff characteristics may be used instead of the AWG having a wavelength cyclic characteristic. For example, the first multiplexer-demultiplexer 31 and the second multiplexer-demultiplexer 32 may include a plurality of MZ filters whose phases are shifted so that the connection between the uplink wavelength and the downlink wavelength is inverted, and an optical multiplexer-demultiplexer connected to a port on the upstream side of each MZ filter. Furthermore, for example, the first multiplexer-demultiplexer 31 and the second multiplexer-demultiplexer 32 may include a plurality of WDM filters having shifted reflection wavelength ranges, and an optical multiplexer-demultiplexer connected to a port on the upstream side of each WDM filter.

Figure 8:
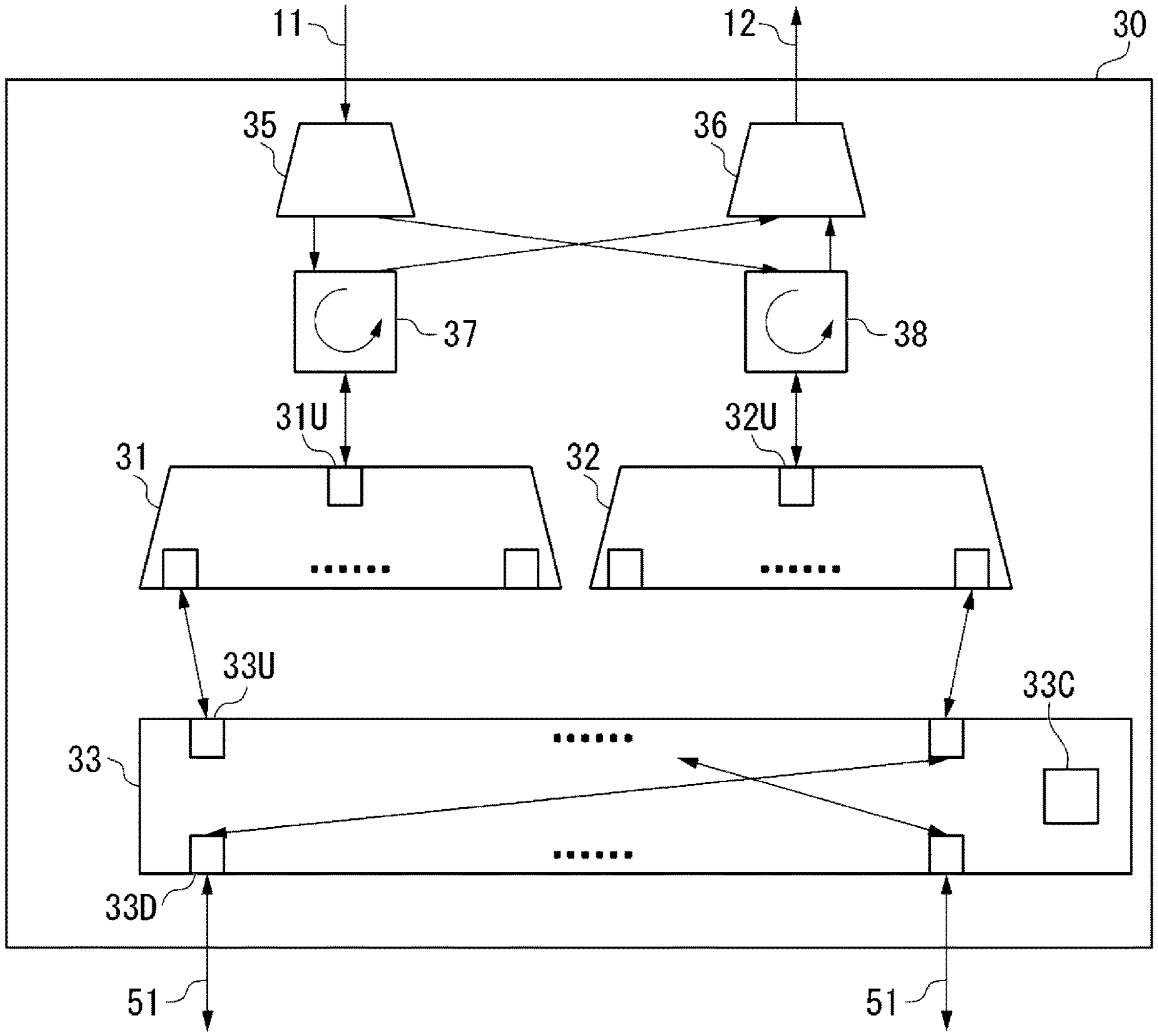
FIG. 8 is a schematic block diagram illustrating a configuration of the optical gateway device according to a second embodiment.

FIG. 8 is a schematic block diagram illustrating a configuration of the optical gateway device 30 according to the second embodiment. The optical gateway device 30 according to the second embodiment includes the first multiplexer-demultiplexer 31, the second multiplexer-demultiplexer 32, the optical switch 33, a first coupler 35, a second coupler 36, a first circulator 37, and a second circulator 38. The first coupler 35 and the second coupler 36 include the AWG or the WDM filter, and perform wavelength selective multiplexing and demultiplexing.

The first coupler 35 includes one first port and two second ports. The first port is connected to the first fiber 11, and the second port is connected to the first circulator 37 and the second circulator 38. The first coupler 35 separates the multiplexed signal input from the first fiber 11 into a signal of the first wavelength group and a signal of the second wavelength group. The first coupler 35 outputs the signal of the first wavelength group to the first circulator 37 and outputs the signal of the second wavelength group to the second circulator 38.

The second coupler 36 includes one first port and two second ports. The first port is connected to the second fiber 12, and the second port is connected to the first circulator 37 and the second circulator 38. The second coupler 36 multiplexes the signal of the second wavelength group input from the first circulator 37 and the signal of the first wavelength group input from the second circulator 38. The second coupler 36 outputs the multiplexed signal to the second fiber 12.

The first circulator 37 is connected to the upstream port 31U of the first multiplexer-demultiplexer 31, the first coupler 35, and the second coupler 36. The first circulator 37 outputs the signal input from the first coupler 35 to the upstream port 31U of the first multiplexer-demultiplexer 31. The first circulator 37 outputs a signal input from the upstream port 31U of the first multiplexer-demultiplexer 31 to the second coupler 36.

The second circulator 38 is connected to the upstream port 32U of the second multiplexer-demultiplexer 32, the first coupler 35, and the second coupler 36. The second circulator 38 outputs the signal input from the first coupler 35 to the upstream port 32U of the second multiplexer-demultiplexer 32. The second circulator 38 outputs a signal input from the upstream port 32U of the second multiplexer-demultiplexer 32 to the second coupler 36.

The first multiplexer-demultiplexer 31 and the second multiplexer-demultiplexer 32 according to the second embodiment include the AWG having a wavelength cyclic characteristic of the number of cycles M. The number of cycles M capable of implementing bidirectional transmission using the same wavelength is equal to or more than two and equal to or less than [N/2]. The number of cycles M of the first multiplexer-demultiplexer 31 and the second multiplexer-demultiplexer 32 according to the second embodiment is set to two. In this case, the number of wavelengths per cycle is [N/2].

The first multiplexer-demultiplexer 31 includes one upstream port 31U and M downstream ports 31D. The upstream port 31U is connected to the first circulator 37. The M downstream ports 31D are connected to the corresponding upstream ports 33U of the optical switch 33. The first multiplexer-demultiplexer 31 demultiplexes the multiplexed signal input to the upstream port 31U into M optical signal groups, and outputs the M optical signal groups from the corresponding downstream port 31D.

The second multiplexer-demultiplexer 32 includes one upstream port 32U and [N/M] downstream ports 32D. The upstream port 32U is connected to the second circulator 38. The M downstream ports 32D are connected to the corresponding upstream ports 33U of the optical switch 33. The second multiplexer-demultiplexer 32 multiplexes the optical signal group input to the [N/M] downstream ports 32D, and outputs the multiplexed signal from the upstream port 32U.

Here, when a group of the first to [N/2]-th wavelengths from the shorter wavelength side of the N wavelengths is referred to as a first wavelength group, and a group of the [N/2+1]-th to 2[N/2]-th wavelengths is referred to as a second wavelength group, in all of the respective downstream ports 31D of the first multiplexer-demultiplexer 31 and the respective downstream ports 32D of the second multiplexer-demultiplexer 32, a plurality of wavelengths in a cci relationship include wavelengths belonging to the first wavelength group and wavelengths belonging to the second wavelength group.

The optical switch 33 includes at least 2[N/M] upstream ports 33U, a plurality of downstream ports 33D, and the control device 33C. The downstream port 33D is connected to the third fiber 51. The optical switch 33 transmits an optical signal input to the upstream port 33U to any one of the plurality of downstream ports 33D. In addition, the optical switch 33 transmits an optical signal input to the downstream port 33D to the upstream port 33U corresponding to the wavelength. The correspondence relationship between the upstream port 33U and the downstream port 33D in the optical switch 33 is determined according to a control signal by the control device 33C. The control device 33C allocates the wavelength of the first wavelength group and the wavelength of the second wavelength group in the relationship to the uplink signal and the downlink signal of the third fiber 51. Thus, the downlink signal of the first wavelength, which is the wavelength of the first wavelength group, and the uplink signal of the second wavelength in the relationship with the first wavelength pass through one downstream port 31D of the first multiplexer-demultiplexer 31. Similarly, the uplink signal of the first wavelength and the downlink signal of the second wavelength pass through one downstream port 32D of the second multiplexer-demultiplexer 32.

The control device 33C sets the wavelengths and the paths so as to satisfy all of the following four conditions. The first condition is that different wavelengths in a relationship are allocated to an uplink signal and a downlink signal of one service device 50. The second condition is that the wavelength of one of the uplink signal and the downlink signal belongs to the first wavelength group and the wavelength of the other belongs to the second wavelength group. The third condition is that the wavelength of an uplink signal passing through the same transmission path in the core network 10 is different for each service device 50. The fourth condition is that a wavelength of a downlink signal passing through the same transmission path in the core network 10 is different for each service device 50.

<<Operations and Effects>>

As described above, in the optical gateway device 30 according to the second embodiment, the first multiplexer-demultiplexer 31 processes the downlink signal of the first wavelength group and the uplink signal of the second wavelength group, and the second multiplexer-demultiplexer 32 processes the downlink signal of the second wavelength group and the uplink signal of the first wavelength group. That is, in the optical gateway device 30, a direction in which a wavelength component out of a first wavelength travels in the optical signal passing through the upstream port 31U of the first multiplexer-demultiplexer 31 and a direction in which a wavelength component out of the first wavelength travels in the optical signal passing through the upstream port 32U of the second multiplexer-demultiplexer 32 are opposite to each other. The first wavelength group and the second wavelength group are in a cyclic relationship with each other in the first multiplexer-demultiplexer 31 and the second multiplexer-demultiplexer 32. Thus, the optical gateway device 30 can prevent interference due to reflection of the uplink signal and the downlink signal by making wavelengths of optical signals transmitted by the single-core bidirectional transmission in the service device 50 different between the upstream direction and the downstream direction. Furthermore, the optical gateway device 30 can improve the wavelength use efficiency by using the same wavelength component in each transmission path of the core network 10. Furthermore, the optical gateway device 30 according to the second embodiment can reduce the number of ports of the first multiplexer-demultiplexer 31, the second multiplexer-demultiplexer 32, and the optical switch 33.

Note that, in the second embodiment, an example in which the number of cycles M of the first multiplexer-demultiplexer 31 and the second multiplexer-demultiplexer 32 is two has been described, but in another embodiment, the number of cycles M may not be two as long as it is equal to or more than two and equal to or less than [N/2].

For example, by making the number of cycles M four or more, that is, four or more rounds in one port, the degree of freedom and addition capability of the optical gateway device 30 can be improved. For example, if the number of wavelengths N is 80 and the number of cycles M is four, the same multiplexer-demultiplexer as the first multiplexer-demultiplexer 31 and the second multiplexer-demultiplexer 32 can be used as the multiplexer-demultiplexer to be added when 40 wavelengths are used at the introduction stage of the optical gateway device 30, the remaining 40 wavelengths are added at the time of addition, and 80 wavelengths are used. At the time of addition, the first coupler 35 and the second coupler 36 are replaced with the AWG or a filter that divides the wavelength into four. In addition, an optical coupler may be installed between the first coupler 35 and the second coupler 36 and each circulator, and each of the optical couplers may be branched into an upstream side and a downstream side and connected to the circulator. In addition, a component to be multiplexed/branched may be installed between the circulator and the multiplexer-demultiplexer. Note that the control device 33C allows use of a plurality of paths in the same direction for one service device 50, use of the same wavelength in each path, and allocation of signals of the same wavelength to different service devices 50, so that it is possible to achieve on-demand addition of AWG.

In addition, there is also an effect that the AWG types can be unified. In a case where the AWG is added on demand, the control device 33C of the optical gateway device 30 allows one service device 50 to use a plurality of paths in the same direction and use the same wavelength in each path. For example, the control device 33C may allocate the first wavelength and the second wavelength to the uplink signal of one service device 50, and may allocate the third wavelength and the fourth wavelength to the downlink signal. Further, when the AWG is added, the control device 33C allows signals of the same wavelength to be allocated to different service devices 50. Thus, the optical gateway device 30 can achieve addition of the AWG on demand. Specifically, a multiplexer-demultiplexer of the same type as the first multiplexer-demultiplexer 31 and the second multiplexer-demultiplexer 32 is added as the number of service devices 50 to be connected increases. Then, the upstream port of the added multiplexer-demultiplexer and the upstream port of the first multiplexer-demultiplexer 31 or the second multiplexer-demultiplexer 32 are multiplexed or branched to connect the added multiplexer-demultiplexer to the core network 10. Addition in this manner is possible until the number of AWGs reaches [N/(2m)].

First Modification

Figure 9:
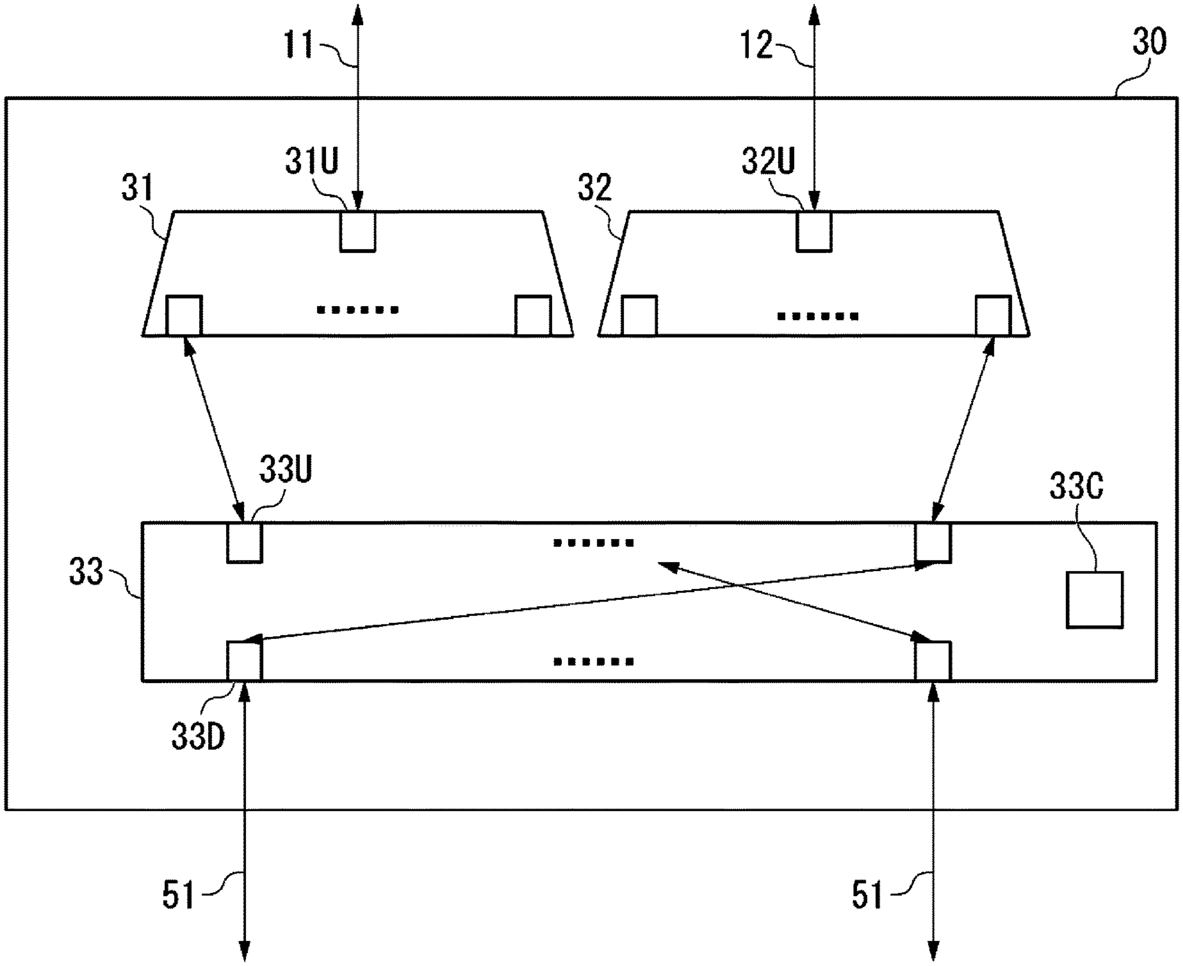
FIG. 9 is a diagram illustrating a configuration of the optical gateway device according to a first modification of the second embodiment.

In the optical gateway device 30 according to the second embodiment, the optical fiber connected to the upstream side performs the single-core unidirectional transmission, but the embodiment is not limited thereto. For example, an optical fiber connected to the upstream side of the optical gateway device 30 according to another embodiment may perform the single-core bidirectional transmission. FIG. 9 is a diagram illustrating a configuration of the optical gateway device 30 according to a first modification of the second embodiment. In the first fiber 11 of the core network 10 according to the first modification of the second embodiment, the optical signal related to the first wavelength group is directed in the downstream direction, and the optical signal related to the second wavelength group is directed in the upstream direction. In the second fiber 12 of the core network 10 according to the first modification of the second embodiment, the optical signal related to the first wavelength group is directed in the upstream direction, and the optical signal related to the second wavelength group is directed in the downstream direction. In this case, the optical gateway device 30 may not include the first coupler 35, the second coupler 36, the first circulator 37, and the second circulator 38. That is, the upstream port 31U of the first multiplexer-demultiplexer 31 is connected to the first fiber 11, and the upstream port 32U of the second multiplexer-demultiplexer 32 is connected to the second fiber 12, so that it is possible to correspond to the core network 10 related to the single-core bidirectional transmission.

Second Modification

Figure 10:
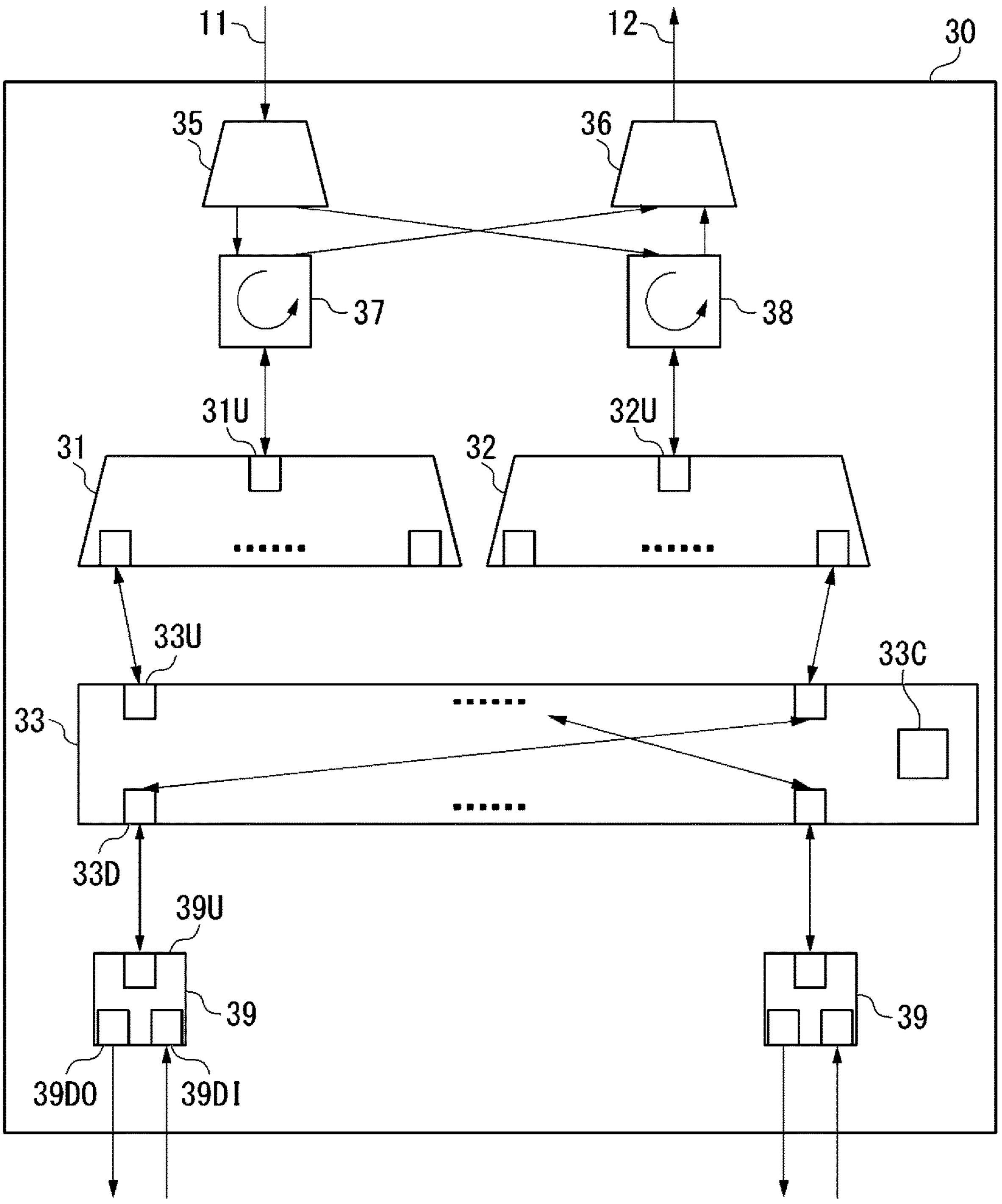
FIG. 10 is a diagram illustrating a configuration of the optical gateway device according to a second modification of the second embodiment.

In the optical gateway device 30 according to the second embodiment, the optical fiber connected to the downstream side performs the single-core bidirectional transmission, but the embodiment is not limited thereto. For example, an optical fiber connected to the downstream side of the optical gateway device 30 according to another embodiment may perform the single-core unidirectional transmission. FIG. 10 is a diagram illustrating a configuration of the optical gateway device 30 according to a second modification of the second embodiment.

In a case where the optical fiber connected to the downstream side performs the single-core unidirectional transmission, the optical gateway device 30 according to the second modification of the second embodiment includes N up-down separators 39 on the downstream side of the optical switch 33. The up-down separator 39 includes an upstream port 39U, a downstream input port 39DI, and a downstream output port 39DO. The upstream port 39U is connected to the optical switch 33. The downstream input port 39DI and the downstream output port 39DO are connected to the service device 50. The up-down separator 39 outputs the optical signal input to the downstream input port 39DI from the upstream port 39U. The up-down separator 39 outputs the optical signal input to the upstream port 39U from the downstream output port 39DO. The up-down separator 39 may include, for example, an optical circulator. The up-down separator 39 may include, for example, a wavelength multiplexing-demultiplexing module.

Third Modification

Figure 11:
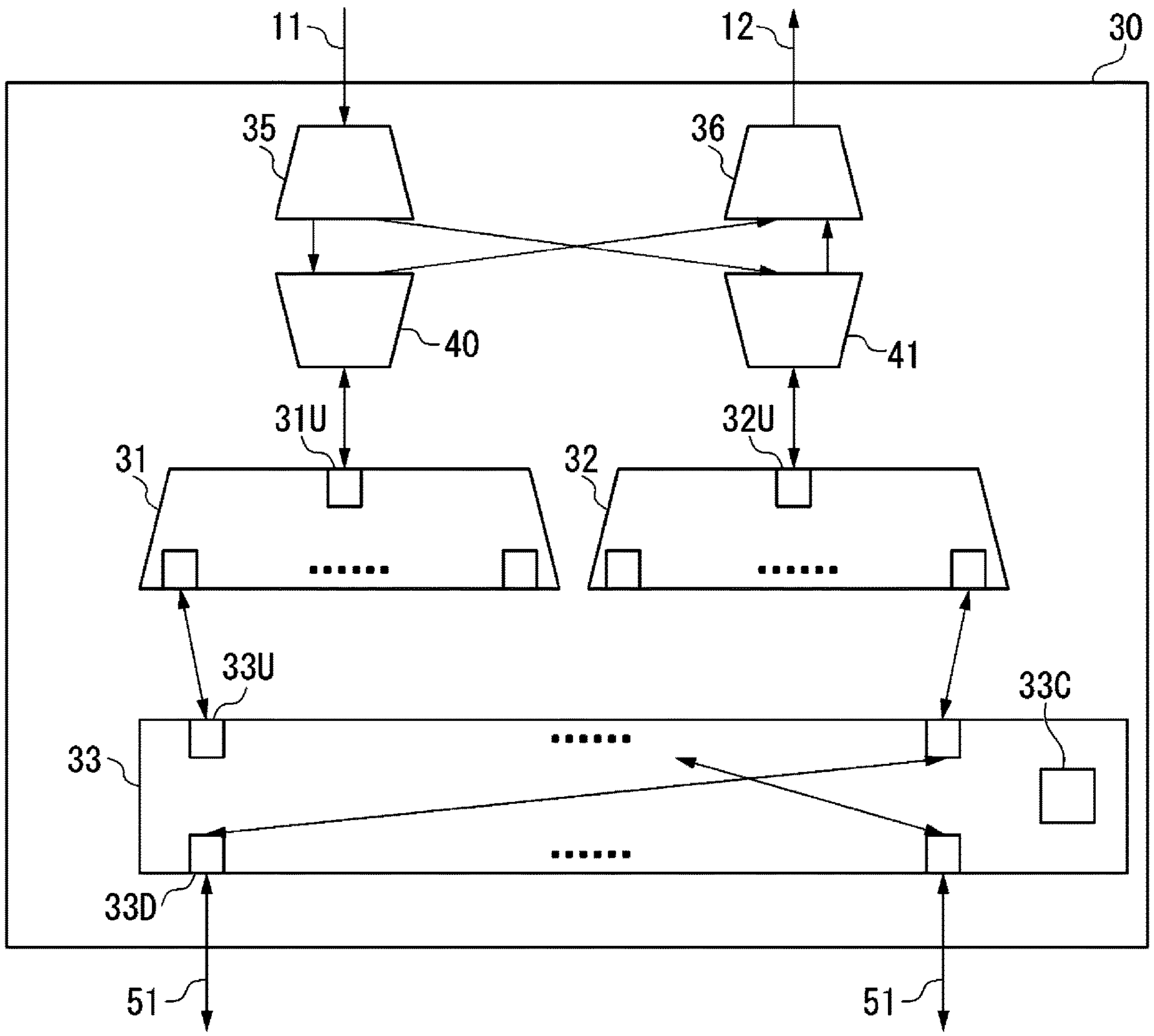
FIG. 11 is a diagram illustrating a configuration of the optical gateway device according to a third modification of the second embodiment.

The optical gateway device 30 according to the second embodiment includes the first circulator 37 and the second circulator 38 connected to the first coupler 35 and the second coupler 36, but the embodiment is not limited thereto. For example, the optical gateway device 30 according to another embodiment may include a third coupler 40 and a fourth coupler 41 instead of the first circulator 37 and the second circulator 38. FIG. 11 is a diagram illustrating a configuration of the optical gateway device 30 according to a third modification of the second embodiment.

The third coupler 40 according to the third modification of the second embodiment transmits the signal of the first wavelength group input from the first coupler 35 to the upstream port 32U of the second multiplexer-demultiplexer 32. Further, the third coupler 40 transmits the signal of the second wavelength group in the signal input from the upstream port 32U of the second multiplexer-demultiplexer 32 to the second coupler 36.

The fourth coupler 41 according to the third modification of the second embodiment transmits the signal of the second wavelength group input from the first coupler 35 to the upstream port 32U of the second multiplexer-demultiplexer 32. Further, the fourth coupler 41 transmits the signal of the first wavelength group in the signal input from the upstream port 32U of the second multiplexer-demultiplexer 32 to the second coupler 36.

Fourth Modification

The optical gateway device 30 according to the second embodiment includes the two multiplexer-demultiplexers 31 and 32 having the number of cycles M of [N/2], but the number of cycles M of the multiplexer-demultiplexer according to another embodiment is not limited thereto, and may be less than [N/2].

Figure 12:
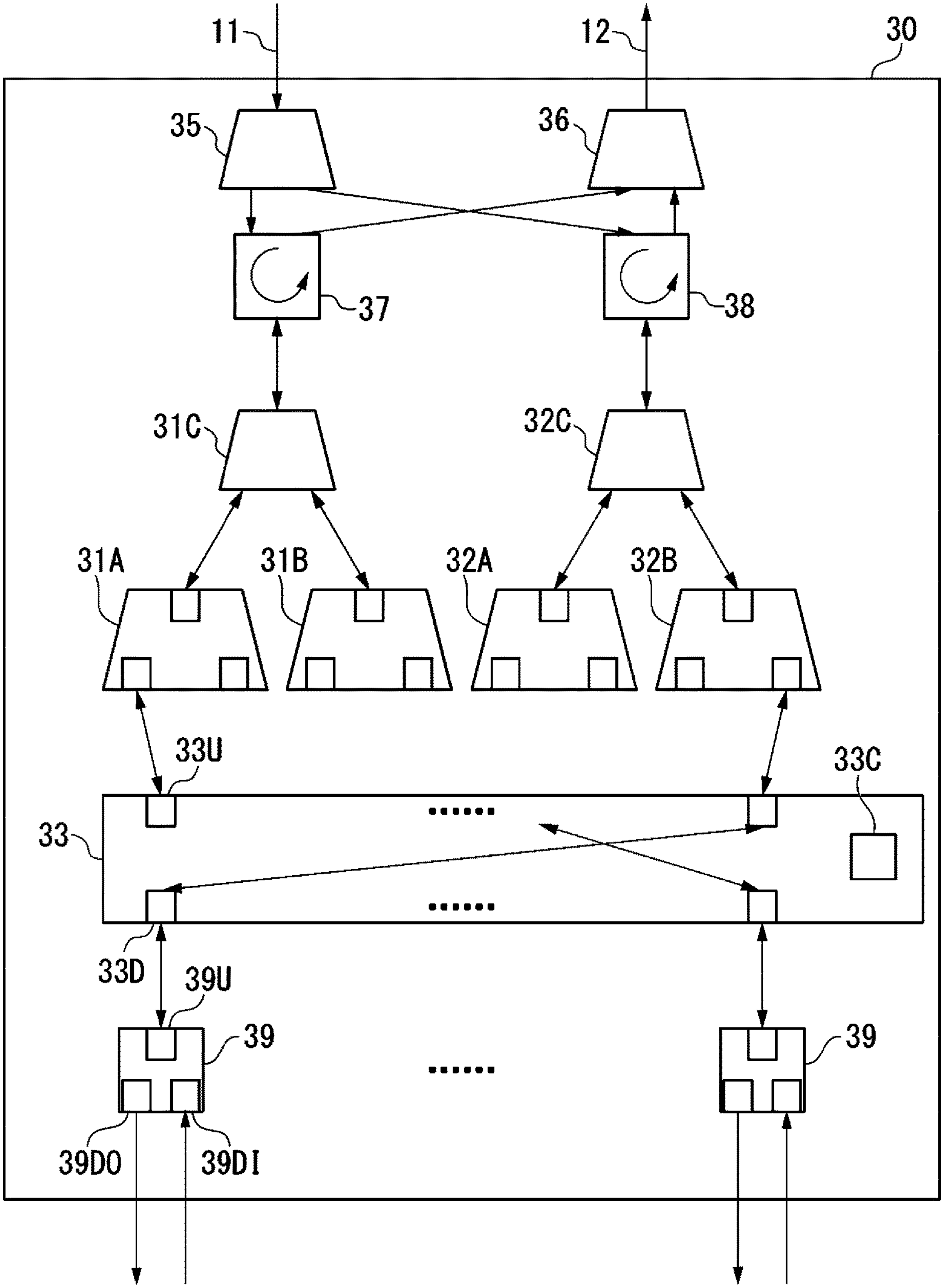
FIG. 12 is a diagram illustrating a configuration of the optical gateway device according to a fourth modification of the second embodiment.

FIG. 12 is a diagram illustrating a configuration of the optical gateway device 30 according to a fourth modification of the second embodiment. The optical gateway device 30 according to the fourth modification of the second embodiment includes four multiplexer-demultiplexers 31A, 31B, 32A, and 32B with the number of cycles M of [N/4], and two couplers 31C and 32C. An upstream port of the multiplexer-demultiplexer 31A and an upstream port of the multiplexer-demultiplexer 31B are connected to a downstream port of the coupler 31C. Note that all of the multiplexer-demultiplexers 31A, 31B, 32A, and 32B have a wavelength cyclic characteristic. The first circulator 37 is connected to the upstream port of the coupler 31C. An upstream port of the multiplexer-demultiplexer 32A and an upstream port of the multiplexer-demultiplexer 32B are connected to a downstream port of the coupler 32C. The second circulator 38 is connected to the upstream port of the coupler 32C.

Figure 13:
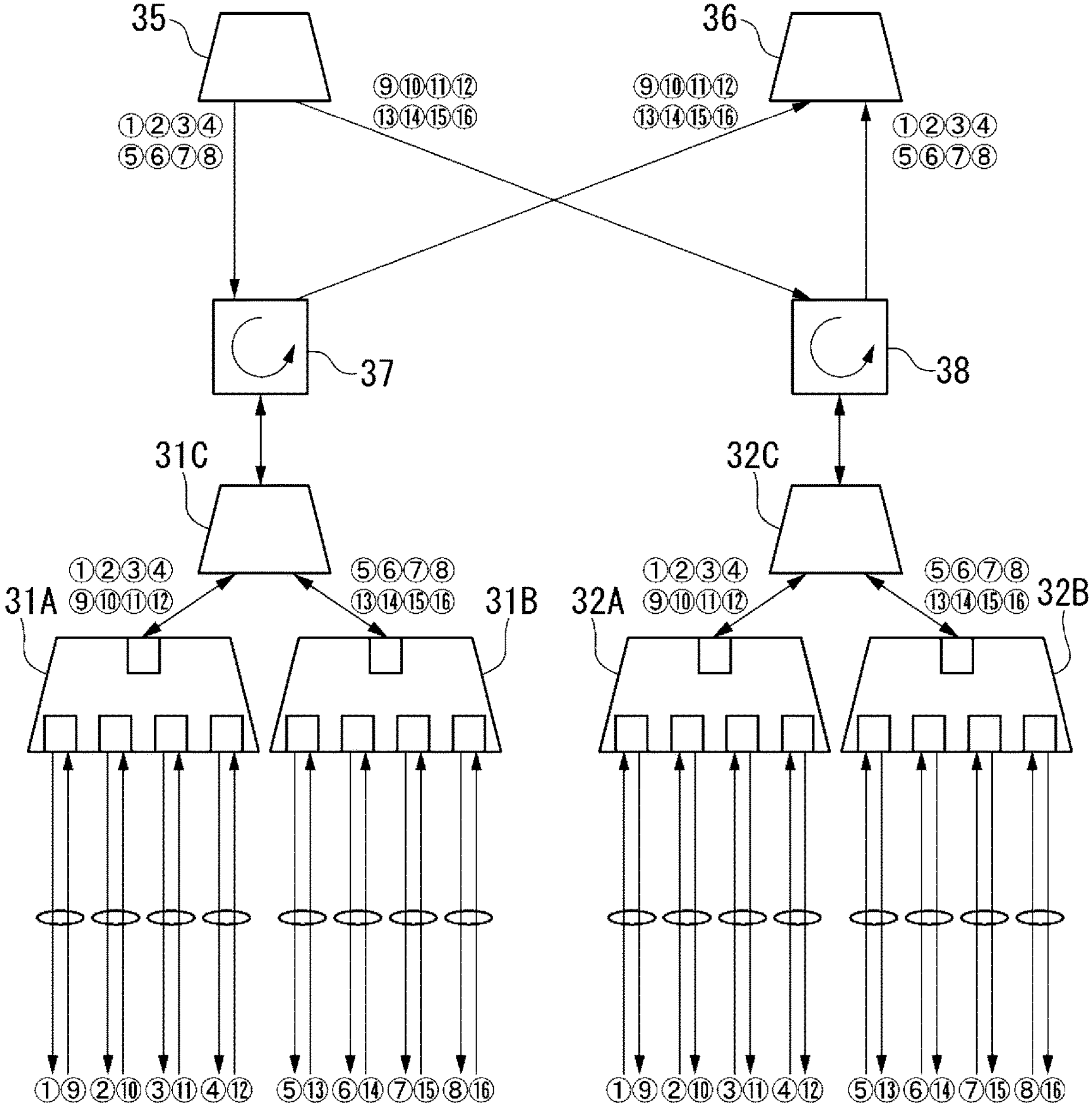
FIG. 13 is a diagram illustrating a relationship between a multiplexer-demultiplexer and a wavelength according to the fourth modification of the second embodiment.

FIG. 13 is a diagram illustrating a relationship between a multiplexer-demultiplexer and a wavelength according to the fourth modification of the second embodiment.

For example, in a case where the number of wavelengths N is 16, the number of cycles M of each multiplexer-demultiplexer is four. When the 16 wavelengths are referred to as a first wavelength . . . a 16th wavelength in ascending order, the following cyclic characteristic is established. At a first downstream port of each multiplexer-demultiplexer, the first wavelength, the fifth wavelength, the ninth wavelength, and the 13th wavelength have a cyclic characteristic with each other. At a second downstream port of each multiplexer-demultiplexer, the second wavelength, the sixth wavelength, the 10th wavelength, and the 14th wavelength have a cyclic characteristic with each other. At a third downstream port of each multiplexer-demultiplexer, the third wavelength, the seventh wavelength, the 11th wavelength, and the 15th wavelength have a cyclic characteristic with each other. At a fourth downstream port of each multiplexer-demultiplexer, the fourth wavelength, the eighth wavelength, the 12th wavelength, and the 16th wavelength have a cyclic characteristic with each other.

As illustrated in FIG. 13, the control device 33C allocates wavelengths shifted from each other by 2M (=[N/2]) to the uplink signal and the downlink signal at each downstream port of each multiplexer-demultiplexer. The control device 33C allocates the multiplexer-demultiplexer 31A and the multiplexer-demultiplexer 31B so that the wavelengths do not overlap each other. Specifically, the control device 33C allocates the first wavelength to the [N/4]-th wavelength to the downlink signal of the multiplexer-demultiplexer 31A, and allocates the [1+N/4]-th wavelength to the [N/2]-th wavelength to the downlink signal of the multiplexer-demultiplexer 31B. Further, the control device 33C allocates the multiplexer-demultiplexer 32A and the multiplexer-demultiplexer 32B so that the wavelengths do not overlap each other. Specifically, the control device 33C allocates the [1+N/2]-th wavelength to the [3N/4]-th wavelength to the downlink signal of the multiplexer-demultiplexer 32A, and allocates the [1+3N/4]-th wavelength to the N-th wavelength to the downlink signal of the multiplexer-demultiplexer 32B.

In this case, the couplers 31C and 32C switch the input and output ports every [N/4]cycle. For example, the couplers 31C and 32C according to the fourth modification of the second embodiment include an MZ filter, an MZ filter with a ring resonator, or the like.

Thus, the optical gateway device 30 according to the fourth modification of the second embodiment can make the wavelength of the optical signal transmitted by the single-core bidirectional transmission in the service device 50 different between the upstream direction and the downstream direction and use the same wavelength component in each transmission path of the core network 10.

Fifth Modification

Figure 14:
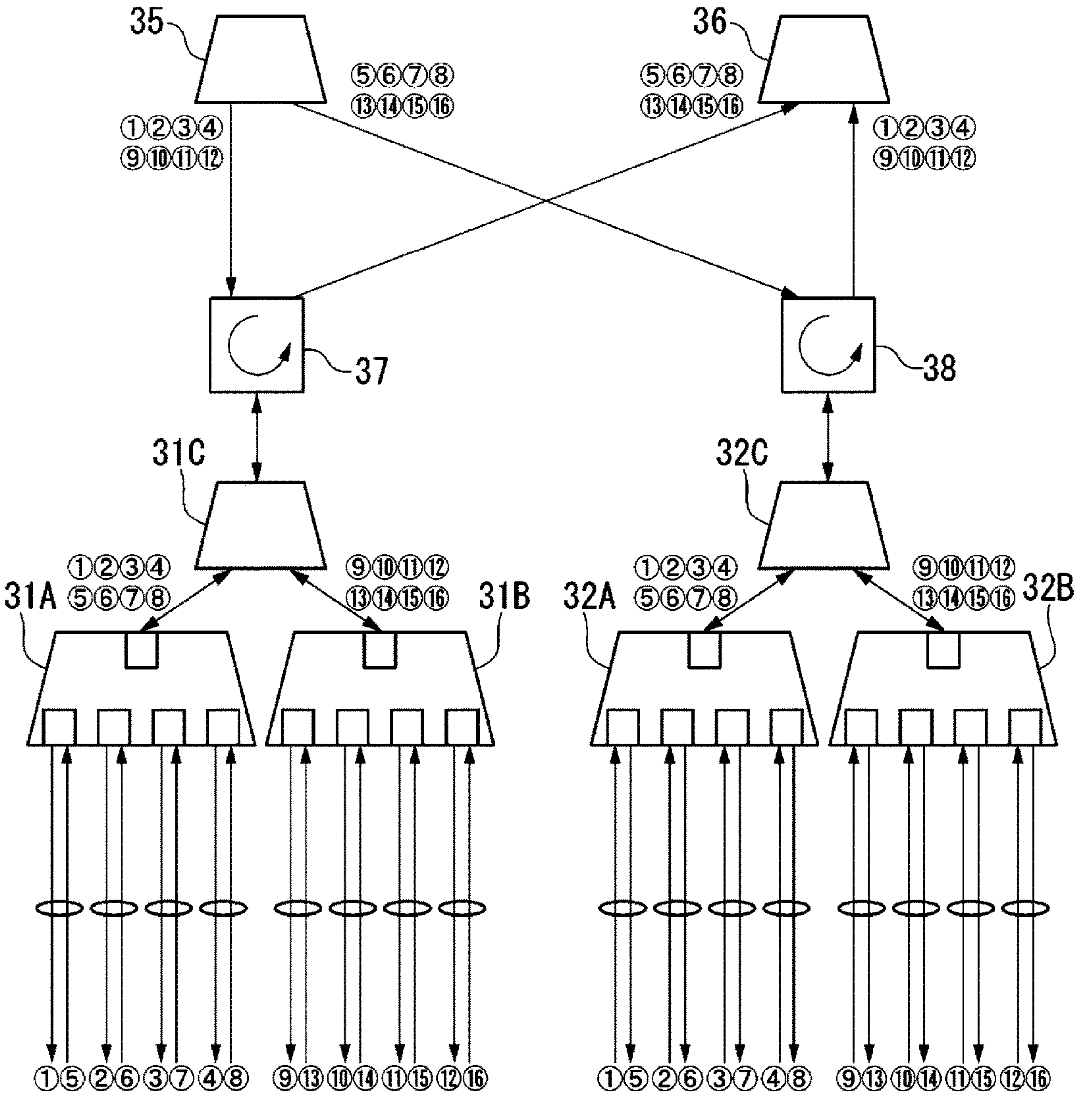
FIG. 14 is a diagram illustrating a relationship between a multiplexer-demultiplexer and a wavelength according to a fifth modification of the second embodiment.

The optical gateway device 30 according to a fifth modification of the second embodiment has a configuration similar to that of the fourth modification, and has a different wavelength to be allocated to a port of each multiplexer-demultiplexer. FIG. 14 is a diagram illustrating a relationship between a multiplexer-demultiplexer and a wavelength according to the fifth modification of the second embodiment.

As illustrated in FIG. 14, the control device 33C allocates wavelengths shifted from each other by M (=[N/4]) to the uplink signal and the downlink signal at each downstream port of each multiplexer-demultiplexer. The control device 33C allocates the multiplexer-demultiplexer 31A and the multiplexer-demultiplexer 31B so that the wavelengths do not overlap each other.

Specifically, the control device 33C allocates the first wavelength to the [N/4]-th wavelength to the downlink signal of the multiplexer-demultiplexer 31A, and allocates the [1+N/2]-th wavelength to the [3N/4]-th wavelength to the downlink signal of the multiplexer-demultiplexer 31B. Further, the control device 33C allocates the multiplexer-demultiplexer 32A and the multiplexer-demultiplexer 32B so that the wavelengths do not overlap each other. Specifically, the control device 33C allocates the [1+N/4]-th wavelength to the [N/2]-th wavelength to the downlink signal of the multiplexer-demultiplexer 32A, and allocates the [1+3N/4]-th wavelength to the N-th wavelength to the downlink signal of the multiplexer-demultiplexer 32B.

In this case, the couplers 31C and 32C switch the input and output ports between a group of wavelengths equal to or more than the [N/2] wavelength and a group of wavelengths less than the [N/2] wavelength. For example, the couplers 31C and 32C according to the fifth modification of the second embodiment include WDM filters.

On the other hand, the first coupler 35 and the second coupler 36 switch the input and output ports every [N/4] cycle. For example, the first coupler 35 and the second coupler 36 according to the fifth modification of the second embodiment include an MZ filter, an MZ filter with a ring resonator, or the like.

Sixth Modification

Figure 15:
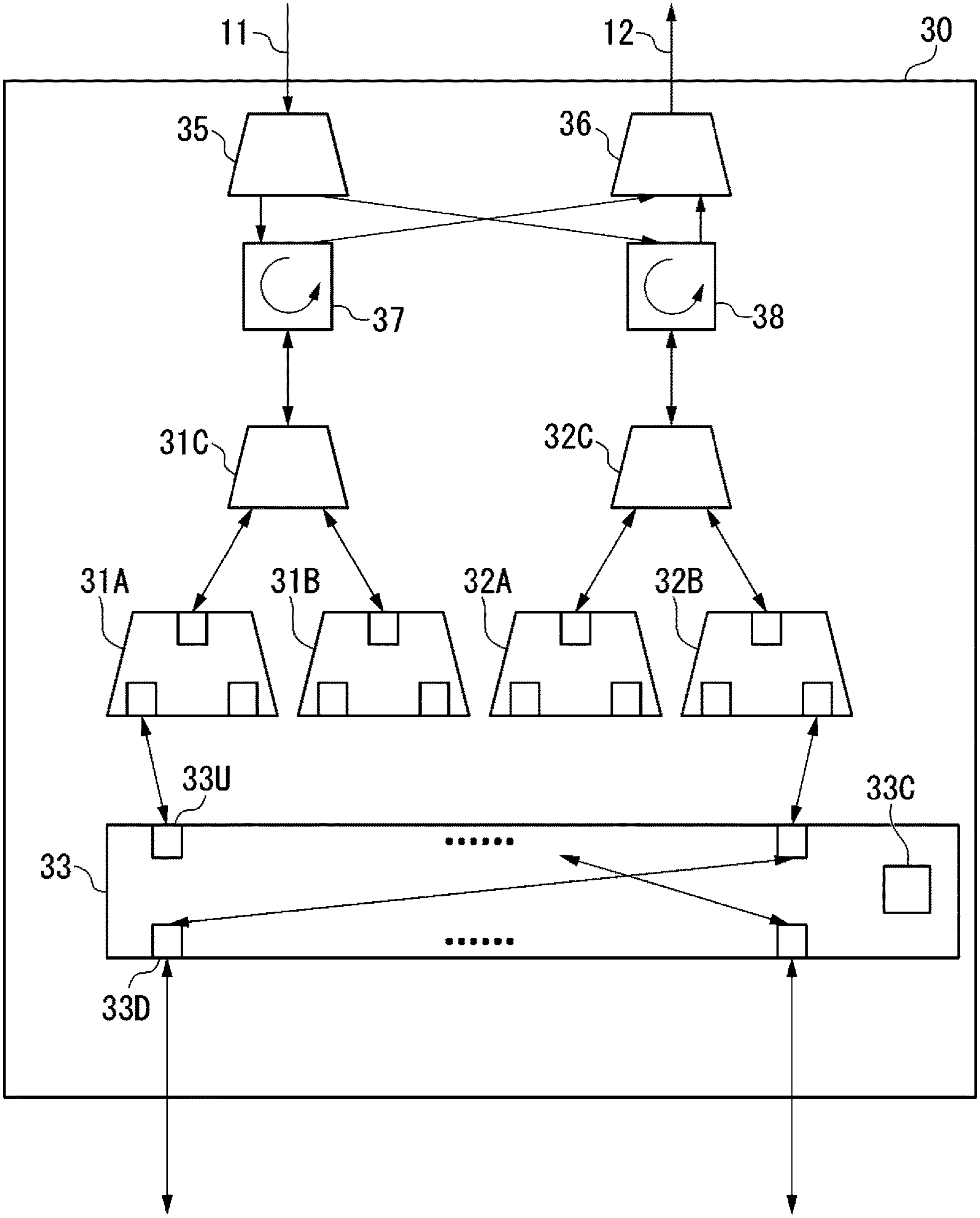
FIG. 15 is a diagram illustrating a configuration of the optical gateway device according to a sixth modification of the second embodiment.

The optical gateway device 30 according to the fourth and fifth modifications of the second embodiment transmits an optical signal by the single-core unidirectional transmission with the service device 50. On the other hand, the optical gateway device 30 according to a sixth modification transmits an optical signal by single-core bidirectional transmission with the service device 50. FIG. 15 is a diagram illustrating a configuration of an optical gateway device according to the sixth modification of the second embodiment. In the optical gateway device 30 according to the sixth modification, the service device 50 is connected to the downstream port 33D of the optical switch 33 without passing through the up-down separator 39. That is, the optical gateway device 30 according to the sixth modification of the second embodiment may not include the up-down separator 39.

OTHER EMBODIMENTS

Hereinabove, an embodiment is described in detail with reference to the drawings; however, the specific configuration is not limited to those described above, and various design changes and the like can be made.

The first multiplexer-demultiplexer 31 and the second multiplexer-demultiplexer 32 according to the above-described embodiment include the AWG, but are not limited thereto. For example, the first multiplexer-demultiplexer 31 and the second multiplexer-demultiplexer 32 according to another embodiment may be achieved by an MZ filter or may use a wavelength selective switch (WSS).

Note that WSS is usually used for multiplexing or branching in the single-core unidirectional transmission, and the single-core bidirectional transmission cannot be transmitted as it is, and is handled after an optical signal is separated in the up-down one direction. This is because some types of WSS do not have wavelength selectivity and thus may cause undesired wavelengths to be mixed into the port. Therefore, when one WSS is used instead of the first multiplexer-demultiplexer 31 and the second multiplexer-demultiplexer 32, there is a possibility that an uplink signal is conducted as it is even if the uplink signal includes an unintended wavelength, and there is a possibility that a signal addressed to another service device 50 is mixed in the downlink signal. In certain configurations, only one wavelength is selected. For example, the WSS module includes a wavelength multiplexer-demultiplexer 1 provided corresponding to a port that inputs and outputs a wavelength-multiplexed optical signal, a plurality of wavelength multiplexer-demultiplexers 2 provided corresponding to each port on the separation side, and an optical switch that connects a port of each wavelength on the demultiplexing side of the wavelength multiplexer-demultiplexer 1 to any one of the plurality of wavelength multiplexer-demultiplexers 2. Thus, different wavelengths cannot be transmitted up and down. Accordingly, in a case where this type of WSS is used, it is necessary to create a new WSS different from a general WSS, which employs AWG with a cyclic characteristic as a wavelength multiplexer-demultiplexer, and to allocate an appropriate wavelength and path to the service device 50 in the optical switch 33.

In addition, in another embodiment, the optical switch 33 may be implemented using a multicast switch that implements a transponder aggregator, or may be implemented using a WSS module. In the multicast switch that implements the transponder aggregator, the optical switch 33 includes, for example, L couplers corresponding to the upstream port 33U and N switches corresponding to the downstream port 33D. The couplers include one first port and N second ports. The switches include one first port and L second ports. The second port of each coupler and the second port of each switch are fully coupled to each other. That is, the optical switch 33 has L×N ports. However, in this configuration, since the optical signal is combined and branched by the coupler, there is a possibility that an unintended wavelength is conducted for the uplink signal, and the unintended wavelength is blocked by the filter for the downlink signal. Thus, when the optical switch 33 is configured on the upstream side, there is a possibility that an unintended wavelength is conducted. On the other hand, when it is configured on the downstream side, only a wavelength set in advance by the filter can pass. Accordingly, in order to make the multicast switch correspond to the single-core bidirectional transmission, it is necessary to newly create a multicast switch including a filter capable of selecting a plurality of wavelengths in the uplink direction and the downlink direction by the AWG with a cyclic characteristic or the like and to perform allocation similar to the configuration using the AWG with a cyclic characteristic or the like of the present application with respect to the uplink and downlink wavelengths.

Further, the example in which the optical switch 33 according to the above-described embodiment includes an optical switch such as FXC has been described, but is not limited thereto. An optical switch having another configuration may be used.

The first multiplexer-demultiplexer 31 and the second multiplexer-demultiplexer 32 according to the above-described embodiment handle signals in the same wavelength range, but are not limited thereto. For example, in another embodiment, the first multiplexer-demultiplexer 31 may handle signals having wavelengths from a wavelength λ1 to a wavelength λ10, and the second multiplexer-demultiplexer 32 may handle signals having wavelengths from a wavelength λ6 to a wavelength λ15. In this case, the traveling directions of the wavelength components related to at least the wavelength λ6 to the wavelength λ10 are opposite to each other between the first multiplexer-demultiplexer 31 and the second multiplexer-demultiplexer 32. Even with such a configuration, it is possible to achieve an effect that both the uplink and the downlink can be conducted using the same wavelength for at least some wavelengths.

REFERENCE SIGNS LIST

1 Optical network
10 Core network
11 First fiber
12 Second fiber
30 Optical gateway device
31 First multiplexer-demultiplexer
32 Second multiplexer-demultiplexer
33 Optical switch
33C Control device
34 Up-down separator
35 First coupler
36 Second coupler
37 First circulator
38 Second circulator
39 Up-down separator
50 Service device
51 Third fiber

The invention claimed is:

1. An optical gateway device, comprising:

a first multiplexer-demultiplexer that includes a first port and a plurality of second ports, is configured to separate an optical signal input from the first port and to output separated optical signals from the plurality of second ports, and is configured to multiplex optical signals input from the plurality of second ports and to output a multiplexed optical signal from the first port;

a second multiplexer-demultiplexer that includes a third port and a plurality of fourth ports, is configured to separate an optical signal input from the third port and to output separated optical signals from the plurality of fourth ports, and is configured to multiplex optical signals input from the plurality of fourth ports and to output a multiplexed optical signal from the third port; and an optical switch that includes a plurality of fifth ports and a plurality of sixth ports, the plurality of fifth ports are connected to the second ports and the fourth ports, the optical switch configured to perform switching of an optical signal between the plurality of fifth ports and the plurality of sixth ports, wherein a direction in which a wavelength component of a first wavelength out of an optical signal passing through the first port travels and a direction in which the wavelength component of the first wavelength out of an optical signal passing through the third port travels are opposite to each other.

2. The optical gateway device according to claim 1, wherein a wavelength component related to a first wavelength group including the first wavelength out of the optical signal passing through the first port travels in a first direction, and a wavelength component related to a remaining second wavelength group travels in a second direction opposite to the first direction, and a wavelength component related to the first wavelength group out of the optical signal passing through the third port travels in the second direction, and a wavelength component related to the second wavelength group travels in the first direction.

3. The optical gateway device according to claim 1, wherein all wavelength components of the optical signal passing through the first port travel in a first direction, and all wavelength components of the optical signal passing through the third port travel in a second direction opposite to the first direction.

4. The optical gateway device according to claim 1, wherein the first multiplexer-demultiplexer and the second multiplexer-demultiplexer have a wavelength cyclic characteristic, a direction in which a wavelength component of a second wavelength in a cyclic relationship with the first wavelength out of the optical signal passing through the first port travels is a direction opposite to the direction in which the wavelength component of the first wavelength travels, and a direction in which the wavelength component of the second wavelength out of the optical signal passing through the third port travels is a direction opposite to the direction in which the wavelength component of the first wavelength travels.

5. The optical gateway device according to claim 1, further comprising:

a plurality of up-down separators that includes a seventh port, an eighth port, and a ninth port, is configured to output, from the eighth port, an optical signal input from the seventh port, and is configured to output, from the seventh port, an optical signal input from the ninth port, wherein the eighth port and the ninth port of each of the plurality of up-down separators is connected to each of the plurality of sixth ports or the eighth port of each of the plurality of up-down separators is connected to each of the plurality of fourth ports and the ninth port of each of the plurality of up-down separators is connected to each of the plurality of second ports, respectively.

6. The optical gateway device according to claim 1, further comprising:

an at least one processer configured to allocate a wavelength to be used for an optical signal to a service device connected to the optical gateway device, wherein the at least one processer is configured to allocate different wavelengths to an uplink signal and a downlink signal of the service device.

7. The optical gateway device according to claim 1, further comprising:

a plurality of up-down separators that includes a seventh port, an eighth port, and a ninth port, is configured to output, from the seventh port, an optical signal input from the eighth port, and is configured to output, from the ninth port, an optical input from the seventh port, wherein the seventh port of each of the plurality of up-down separators is connected to each of the plurality of sixth ports, respectively.

8. The optical gateway device according to claim 1, further comprising:

a first up-down separator that includes a tenth port, an eleventh port, and a twelfth port, is configured to output, from the eleventh port, an optical signal input from the tenth port, and is configured to output, from the tenth port, an optical signal input from the twelfth port; and a second up-down separator that includes a thirteenth port, a fourteenth port, and a fifteenth port, is configured to output, from the fourteenth port, an optical signal input from the thirteenth port, and is configured to output, from the thirteenth port, an optical signal input from the fifteenth port, wherein the tenth port is connected to the first port and the thirteenth port is connected to the third port.

9. The optical gateway device according to claim 1, wherein the direction, in which the wavelength component of the first wavelength out of the optical signal passing through the first port travels on a transmission path between the optical gateway device and a plurality of service devices connected to the optical gateway device, and the direction, in which the wavelength component of the first wavelength out of the optical signal passing through the third port travels on the transmission path, are opposite to each other.

10. The optical gateway device according to claim 1, wherein the plurality of sixth ports are connected to a plurality of service devices, which are connected to the optical gateway device, respectively, and the optical switch is configured to perform the switching so that wavelengths, which are different between an upstream direction and a downstream direction of each of the plurality of service devices, are allocated to optical signals.

11. The optical gateway device according to claim 10, wherein the first multiplexer-demultiplexer is configured to separate the optical signal, which is input from the first port and have wavelengths different between the plurality of service devices connected to the optical gateway device, and the second multiplexer-demultiplexer is configured to separate the optical signal, which is input from the third port and have wavelengths different between the plurality of service devices.

12. The optical gateway device according to claim 1, wherein the optical switch is configured to perform switching the optical signal between the plurality of fifth ports, in which optical signals with wavelengths different between a plurality of service devices are output from or input to, and the plurality of sixth ports connected to the plurality of service devices, so that wavelengths different between an upstream direction and a downstream direction of each of the plurality of service devices are allocated to optical signals output from or input to the plurality of sixth ports.

13. The optical gateway device according to claim 1, wherein the optical switch is configured to perform switching the optical signal between the plurality of fifth ports, in which optical signals with wavelengths different between a plurality of service devices are output from or input to, and the plurality of sixth ports, in which optical signals with wavelengths different between an upstream direction and a downstream direction of each of the plurality of service devices.

* * * * *